United States Patent
Sekito et al.

(10) Patent No.: US 9,581,352 B2
(45) Date of Patent: Feb. 28, 2017

(54) CONTROL DEVICE FOR AIR CONDITIONER

(71) Applicant: DENSO CORPORATION, Kariya, Aichi-pref. (JP)

(72) Inventors: Yasuhiro Sekito, Kariya (JP); Keizou Nimura, Nagoya (JP); Tatsuhiro Matsuki, Obu (JP); Kazuhiro Miyazawa, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 364 days.

(21) Appl. No.: 14/355,151

(22) PCT Filed: Oct. 29, 2012

(86) PCT No.: PCT/JP2012/006934
§ 371 (c)(1),
(2) Date: Apr. 29, 2014

(87) PCT Pub. No.: WO2013/065286
PCT Pub. Date: May 10, 2013

(65) Prior Publication Data
US 2014/0284023 A1  Sep. 25, 2014

(30) Foreign Application Priority Data

Nov. 2, 2011  (JP) ................................. 2011-241134
Nov. 2, 2011  (JP) ................................. 2011-241252

(51) Int. Cl.
*F24F 11/02*  (2006.01)
*F24F 13/14*  (2006.01)
(Continued)

(52) U.S. Cl.
CPC ........ *F24F 11/022* (2013.01); *B60H 1/00428* (2013.01); *B60H 1/00857* (2013.01);
(Continued)

(58) Field of Classification Search
CPC ................. F24F 13/1426; F24F 11/022; F24F 2013/1433; B60H 1/00428; B60H 1/00857; B60H 1/00835; H02P 5/68; H02P 25/06; H02P 7/29; H02P 7/04
USPC .............................................. 62/244; 165/59
See application file for complete search history.

(56) References Cited

U.S. PATENT DOCUMENTS 6,178,760 B1 *  1/2001  Tanaka ............... B60H 1/00392
                                                          62/154
6,690,560 B2 *  2/2004  Matsunaga ........ B60H 1/00428
                                                          236/38
(Continued)

FOREIGN PATENT DOCUMENTS

DE     19639252 C1    11/1997
JP    2000-116184 A    4/2000
(Continued)

OTHER PUBLICATIONS

Office Action mailed Aug. 3, 2015 in the corresponding CN application No. 201280051105.9 (in Chinese with English translation).
(Continued)

*Primary Examiner* — Mohammad M Ali
(74) *Attorney, Agent, or Firm* — Harness, Dickey & Pierce, P.L.C.

(57) ABSTRACT

The present disclosure simplifies the H-bridge circuit of the direct current motor for driving the damper (door) that switches the air passages in the indoor unit of an air conditioning device. The control device for an air conditioner that takes in inside or outside air and conditions the air inside an air conditioning unit using an evaporator and a heater core is provided with: a first actuator and a second actuator that drive the multiple dampers installed inside the air conditioning unit for switching the air passages; and three half-bridge circuits that control the first actuator and the second actuator sharing one of the half-bridge circuits. Of the multiple dampers, the first actuator is connected to the
(Continued)

inside/outside air switching damper. Of the multiple dampers, the second actuator is connected to at least one air mix damper.

15 Claims, 13 Drawing Sheets

(51) Int. Cl.
    *H02P 5/68*     (2006.01)
    *H02P 7/29*     (2016.01)
    *H02P 25/06*     (2016.01)
    *B60H 1/00*     (2006.01)

(52) U.S. Cl.
    CPC ............ *F24F 13/1426* (2013.01); *H02P 5/68* (2013.01); *H02P 7/29* (2013.01); *H02P 25/06* (2013.01); *B60H 1/00835* (2013.01); *F24F 2013/1433* (2013.01); *H02P 7/04* (2016.02)

(56) References Cited

U.S. PATENT DOCUMENTS

| | | |
|---|---|---|
| 2003/0227273 A1 | 12/2003 | Misumi |
| 2004/0168454 A1* | 9/2004 | Iritani ................... B60H 1/004 62/230 |
| 2004/0226709 A1* | 11/2004 | Shimizu ............. B60H 1/00857 165/202 |
| 2004/0232864 A1 | 11/2004 | Sunaga et al. |
| 2007/0140454 A1* | 6/2007 | Ito ....................... B60R 11/0264 379/159 |
| 2009/0098817 A1 | 4/2009 | Goto |
| 2011/0162409 A1 | 7/2011 | Okumura et al. |

FOREIGN PATENT DOCUMENTS

| | | |
|---|---|---|
| JP | 2000-201498 A | 7/2000 |
| JP | 2004-015898 A | 1/2004 |
| JP | 2004-345558 A | 12/2004 |
| JP | 2006-103413 A | 4/2006 |
| JP | 2009-090873 A | 4/2009 |
| JP | 2011-148380 A | 8/2011 |
| JP | 2011-201473 A | 10/2011 |
| JP | 2012-121517 A | 6/2012 |

OTHER PUBLICATIONS

International Search Report and Written Opinion of the ISA, ISA/JP, for PCT/JP2012/006934, mailed Jan. 29, 2013.
Office Action for corresponding JP application No. 2011-241252, mailed Jan. 28, 2014, with English translation.
Office Action for corresponding JP application No. 2011-241134, mailed Jan. 28, 2014, with English Translation.

* cited by examiner (a)

(b)

(a) INSIDE/OUTSIDE AIR MODE / ROTATIONAL DIRECTION OF DC MOTOR M1

(b) AIR MIX DAMPER 11a / ROTATIONAL DIRECTION OF DC MOTOR M2

(c) OUTLET MODE / ROTATIONAL DIRECTION OF DC MOTOR M3

(d) AIR MIX DAMPER 11b / ROTATIONAL DIRECTION OF DC MOTOR M4

CONTROL DEVICE FOR AIR CONDITIONER

CROSS REFERENCE TO RELATED APPLICATION

The present application is a U.S. National Phase application under 35 U.S.C. §371 of International Application No. PCT/JP2012/006934, filed on Oct. 29, 2012, and based on Japanese Patent Application No. 2011-241252 filed on Nov. 2, 2011 and Japanese Patent Application No. 2011-241134 filed on Nov. 2, 2011, the disclosures of which are incorporated herein by reference in their entirety.

TECHNICAL FIELD

The present disclosure relates to a control device for an air conditioner.

BACKGROUND ART

Conventionally, an air-conditioner for a vehicle has an indoor unit equipped with a blower unit, a cooler unit, and a heater unit. Many blow-off ports are defined in the indoor unit of the air-conditioner, and air cooled or heated inside is blown off from the blow-off ports. Moreover, the indoor unit includes a ventilation control valve (hereafter referred as damper) which switches intake air between air outside a passenger compartment (hereafter referred as outside air) and air inside the passenger compartment (hereafter referred as inside air), an air mix damper which mixes cooled air and heated air with each other to air-condition, and a mode damper which adjusts the discharge amount of conditioned air blown off from each blow-off port. The damper may be called as a door.

Patent document 1 describes an electric actuator system in which an indoor unit includes an inside/outside air switch door, a driver seat side air mixing door, a passenger seat side air mixing door, and a blow-off mode switch door. Moreover, Patent document 1 discloses direct-current motors provided to respective doors, e.g., the inside/outside air switch door, the driver seat side air mixing door, the passenger seat side air mixing door, and the blow-off mode switch door, and a drive circuit which drives each direct-current motor.

A H-bridged circuit is known as such drive circuit for the direct-current motor in the air-conditioner. The H-bridged circuit for driving the direct-current motor has a circuit in which two switching elements are connected in series, and two of the circuits are disposed between a plus terminal and a minus terminal of a battery in parallel. A direct-current motor is disposed between connecting points at which the two switching elements are connected in the respective circuit. For example, Patent document 2 discloses a H-bridged circuit in which electric field effect type transistor is used as four switching elements. In Patent document 2, two of the transistors are on. A drive signal is input from a control circuit to gate of four electric field effect type transistors, and the two-on-transistors are switched among the four transistors, thereby changing the direction of current flowing through the direct-current motor so as to change the rotational direction of the direct-current motor.

However, in the air-conditioner shown in Patent document 1, if the H bridged circuit shown in Patent document 2 is used for driving four direct-current motors, e.g., the direct-current motor which drives the inside/outside air switch door, the direct-current motor which drives the driver seat side air mixing door, the direct-current motor which drives the passenger seat side air mixing door, and the direct-current motor which drives the blow-off mode switch door, four H bridged circuits are necessary and the circuit composition becomes complicated.

PRIOR ART DOCUMENT

Patent Document

Patent document 1: JP 2006-103413A
Patent document 2: JP 2000-116184A

SUMMARY OF THE INVENTION

The present disclosure is aimed to provide a control device for an air-conditioner in which H bridged circuit of a direct-current motor for driving a damper (door) which switches air passages in an indoor unit of the air-conditioner is simplified and the simplified circuit can perform a control similarly to a case where H bridged circuits are respectively provided to direct-current motors.

According to one aspect of the present disclosure, a control device for an air conditioner which intakes inside air or outside air into an air-conditioner unit to air-condition using an evaporator and a heater core controls actuators which drive plural dampers for switching air passages in the air-conditioner unit by three half bridged circuits, sharing one half bridged circuit, in which one of the actuators is connected to an inside/outside air switch damper, and the other actuator is connected to an air mix damper for a driver seat or a passenger seat.

Therefore, the actuators which drive the plural dampers can be controlled by the three half bridged circuits, sharing one of the half bridged circuits, so the circuit composition can be simplified by reducing the number of half bridged circuits.

For example, the actuators are connected to the three half bridged circuits so that the rotational direction of one of the actuators at a time of inside air mode in which the inside/outside air switch damper closes an intake port for the outside air and the rotational direction of the other of the actuators to close an air intake port of the heater core with the air mix damper become opposite from each other.

Therefore, the inside/outside air switch damper and the air mix damper can be simultaneously driven using the three half bridged circuits by making the rotational directions opposite between the actuators.

For example, the three half bridged circuits are constituted so that an operation by one of the actuators to fully close the outside air intake port with the inside/outside air switch damper and an operation by the other actuator to fully close the air intake port of the heater core with the air mix damper are simultaneously performed.

Therefore, using the three half bridged circuits, simultaneously, the inside/outside air switch damper fully closes the outside air intake port, and the air mix damper fully closes the air intake port of the heater core.

For example, the three half bridged circuits are constituted so that, simultaneously, one of the actuators operates the inside/outside air switch damper to fully close the inside air intake port and the other of the actuators operates the air mix damper to pass all the air to the heater core.

Therefore, using the three half bridged circuits, simultaneously, the inside/outside air switch damper operates to fully close the inside air intake port, and the air mix damper operates to pass all the air to the heater core.

For example, the actuators comprise direct-current motors.

Therefore, an in-vehicle battery can be used as a power supply since the actuators comprise the direct-current motors.

For example, an air mix damper for a driver seat is connected to the other of the actuators.

Therefore, air is drawn from the inside air intake port so as to be cooled at a time of cooling operation, and all the air cooled by the evaporator can bypass the heater core in the driver seat side passage. Thus, the air blown off from the air blow-off port adjacent to the driver seat can be made in the max cool state.

According to one aspect of the present disclosure, a control device for an air conditioner which intakes inside air or outside air into an air-conditioner unit to air-condition using an evaporator and a heater core controls actuators which drive plural dampers for switching air passages in the air-conditioner unit by three half bridged circuits, sharing one half bridged circuit, in which one of the actuators is connected to a mode switch damper, and the other actuator is connected to an air mix damper for a driver seat or a passenger seat.

Therefore, the actuators which drive the plural dampers can be controlled by the three half bridged circuits, sharing one of the half bridged circuits, so the circuit composition can be simplified by reducing the number of half bridged circuits.

For example, when one actuator is rotated in a first direction, a mode is switched by the mode switch damper according to a rotation amount of the one actuator, in order of a face mode in which only a blow-off port switch damper to blow off conditioned-air from a face blow-off port is operated, a bilevel mode in which only a blow-off port switch damper to blow off conditioned-air from the face blow-off port and a foot blow-off port is operated, a foot mode in which only a blow-off port switch damper to blow off conditioned-air from the foot blow-off port is operated, a foot/def in which only a blow-off port switch damper to blow off conditioned-air from the foot blow-off port and a defroster blow-off port is operated, and a def mode in which only a blow-off port switch damper to blow off conditioned-air from the defroster blow-off port is operated. When the one actuator is rotated in a second direction opposite from the first direction, the mode switch damper is switched, according to a rotation amount of the one actuator, in order of the def mode, the foot/def mode, the foot mode, the bilevel mode and the face mode.

Therefore, the mode can be switched in order of the face mode, the bilevel mode, the foot mode, the foot/def mode, and the def mode by rotating only the one actuator in the one direction, and can be switched in the opposite order by rotating in the opposite direction.

For example, in the foot mode, the blow-off port switch damper which blows off conditioned-air from the defroster blow-off port is also operated.

Therefore, also in the foot mode, the conditioned-air can be blown off from the defroster blow-off port.

For example, the actuators are connected to the three half bridged circuits so that the rotational direction of one of the actuators to make the air mix damper to move toward the face mode and the rotational direction of the other of the actuators to close the air intake port of the heater core by the mode switch damper are opposite from each other.

Therefore, the mode switch damper and the air mix damper can be simultaneously driven using the three half bridged circuits by making the rotational directions opposite between the actuators.

For example, the three half bridged circuits are constituted so that an operation by the one of the actuators to set the face mode and an operation by the other of the actuators to fully close the air intake port of the heater core by the air mix damper can be performed simultaneously.

Therefore, the operation to set the face mode by the mode switch damper and the operation to fully close the air intake port of the heater core by the air mix damper can be performed simultaneously using the three half bridged circuits.

For example, the three half bridged circuits are constituted so that an operation by the one of the actuators to set the def mode and an operation by the other of the actuators to make all the air to pass the heater core by the air mix damper can be performed simultaneously.

Therefore, the operation to set the def mode by the mode switch damper and the operation to make all the air to flow in the heater core by the air mix damper can be simultaneously performed using the three half bridged circuits.

For example, the actuators comprise direct-current motors.

Therefore, an in-vehicle battery can be used as a power supply since the actuators comprise the direct-current motors.

For example, an air mix damper for a passenger seat is connected to the other of the actuators.

Therefore, when cooled air is blown off from the face blow-off port in early stage of the cooling operation, all the air cooled by the evaporator can bypass the heater core in the passenger seat side passage. Thus, the air blown off from the air blow-off port adjacent to the passenger seat can be made in the max cool state.

EMBODIMENT TO PRACTICE THE INVENTION

Figure 1:
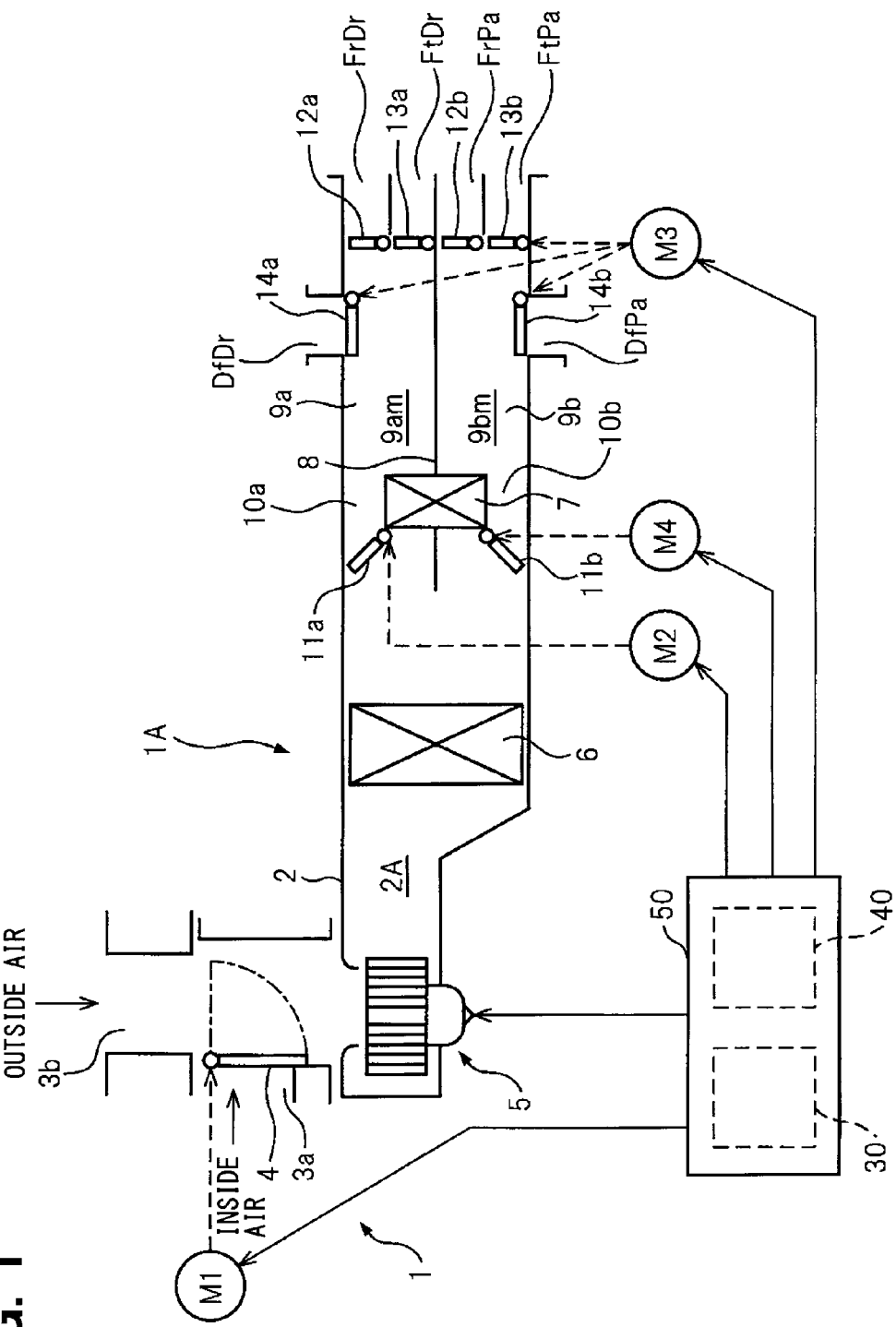
FIG. 1 is a schematic view illustrating a control device for an air-conditioner and an indoor air-conditioner unit according to an embodiment.

FIG. 1 is a schematic view illustrating an outline construction of a vehicle air-conditioner 1 according to an embodiment to which a control device 50 of the present disclosure is applied.

As shown in FIG. 1, the vehicle air-conditioner 1 of this embodiment is equipped with an indoor air-conditioner unit 1A. The indoor air-conditioner unit 1A includes a main part 2 which has an air passage 2A. The main part 2 has an inside air feed port 3a and an outside air feed port 3b from which air is drawn into the air passage 2A, and blow-off ports FrDr, FtDr, DfDr, FrPa, FtPa, DfPa from which air conditioned in the air passage 2A is blown into a passenger compartment. Each of the blow-off ports FrDr, FtDr, DfDr, FrPa, FtPa, DfPa is described in detail later. The inside air feed port 3a intakes air inside the passenger compartment (inside air) into the air passage 2A, and the outside air feed port 3b intakes air outside the passenger compartment (outside air) into the air passage 2A. The inside air feed port 3a and the outside air feed port 3b are opened and closed by an inside/outside air switch damper 4. The inside/outside air switch damper 4 is connected to a direct-current motor M1 through a linkage mechanism (not shown), and performs opening/closing operation by the rotation in the direct-current motor M1.

A centrifugal type blower 5 is arranged in the air passage 2A downstream of the inside air feed port 3a and the outside air feed port 3b. The centrifugal type blower 5 compulsorily sends air drawn into the air passage 2A via the feed port 3a or the feed port 3b toward the downstream side. The air amount sent by the centrifugal type blower 5 is determined by the rotation speed of the centrifugal type blower 5, and the rotation speed of the centrifugal type blower 5 is controlled by an air-conditioner control device 50. An evaporator 6 is arranged downstream of the centrifugal type blower 5 in the air passage 2A, and cools air blown off from the centrifugal type blower 5.

The evaporator 6 constitutes a well-known refrigerating cycle with a compressor etc. in the air-conditioner, and comprises a heat exchanger which cools air flowing inside the air passage 2A. A heater core 7 is disposed in the air passage 2A downstream of the evaporator 6, and comprises a heat exchanger which heats the air cooled by the evaporator 6. The engine cooling water which is heated while cooling the engine of the vehicle flows in the heater core 7 so as to heat the air cooled by the evaporator 6 inside the heater core 7.

A partition wall 8 is arranged in the air passage 2A immediately upstream and downstream of the heater core 7 so as to partition the air passage 2A into a driver seat side passage 9a and a passenger seat side passage 9b. A bypass channel 10a is defined upstream of the driver seat side passage 9a to extend along a side of the heater core 7. Due to the bypass channel 10a, the air cooled by the evaporator 6 bypasses the heater core 7 to flow toward the downstream. Similarly, a bypass channel 10b is defined upstream of the passenger seat side passage 9b to extend along a side of the heater core 7. Due to the bypass channel 10b, the air cooled by the evaporator 6 bypasses the heater core 7 to flow toward the downstream.

Air mix dampers 11a, 11b are respectively arranged in the driver seat side passage 9a and the passenger seat side passage 9b upstream of the heater core 7. The air mix damper 11a adjusts the ratio, by changing the opening degree, of air amount which flows through the heater core 7 and air amount which flows through the bypass channel 10a, for the air flowing through the driver seat side passage 9a. The air warmed by the heater core 7 toward the driver seat side passage 9a and the cooled air passing through the bypass channel 10a are mixed with each other at a mix part 9am located downstream of the heater core 7. The mixture ratio between the warmed air from the heater core 7 and the cooled air from the bypass channel 10a is changed according to the opening degree of the air mix damper 11a, such that the temperature of air mixed in the mix part 9am is adjusted to be a temperature set by a temperature setting switch (not shown) of the air-conditioner.

Similarly, the air mix damper 11b adjusts the ratio, by changing the opening degree, of air amount which flows through the heater core 7 and air amount which flows through the bypass channel 10b, for the air flowing through the passenger seat side passage 9b. The air warmed by the heater core 7 toward the passenger seat side passage 9b and the cooled air passing through the bypass channel 10b are mixed with each other at a mix part 9bm located downstream of the heater core 7. The mixture ratio between the warmed air from the heater core 7 and the cooled air from the bypass channel 10b is changed according to the opening degree of the air mix damper 11b, such that the temperature of air mixed in the mix part 9bm is adjusted to be a temperature set by the temperature setting switch (not shown) of the air-conditioner.

A direct-current motor M2 is connected to the air mix damper 11a through a linkage mechanism (not shown). The opening degree of the air mix damper 11a is adjusted by rotation in the direct-current motor M2. Similarly, a direct-current motor M4 is connected to the air mix damper 11b through a linkage mechanism (not shown). The opening degree of the air mix damper 11b is adjusted by rotation in the direct-current motor M4.

The driver seat side face blow-off port FrDr, the driver seat side foot blow-off port FtDr, and the driver seat side defroster blow-off port DfDr are defined in the main part 2 of the indoor air-conditioner unit 1A downstream of the mix part 9am of the driver seat side passage 9a. The driver seat side face blow-off port FrDr blows off air from the mix part 9am to an upper body of a driver. The driver seat side foot blow-off port FtDr blows off air from the mix part 9am to a lower body of the driver. The driver seat side defroster blow-off port DfDr blows off air from the mix part 9am to a driver seat side area of an inner surface of a windshield.

Similarly, the passenger seat side face blow-off port FrPa, the passenger seat side foot blow-off port FtPa, and the passenger seat side defroster blow-off port DfPa are defined in the main part 2 of the indoor air-conditioner unit 1A downstream of the mix part 9bm of the passenger seat side passage 9b. The passenger seat side face blow-off port FrPa blows off air from the mix part 9bm toward an upper body of a passenger seated on a passenger seat. The passenger seat side foot blow-off port FtPa blows off air from the mix part 9bm toward a lower body of the passenger seated on the passenger seat. The passenger seat side defroster blow-off port DfPa blows off air from the mix part 9bm to a passenger seat side are of the inner surface of the windshield.

The main part 2 of the indoor air-conditioner unit 1A has a blow-off port switch damper 12a which opens and closes the driver seat side face blow-off port FrDr, a blow-off port switch damper 13a which opens and closes the driver seat side foot blow-off port FtDr, and a blow-off port switch damper 14a which opens and closes the driver seat side defroster blow-off port DfDr. Similarly, the main part 2 of the indoor air-conditioner unit 1A has a blow-off port switch damper 12b which opens and closes the passenger seat side face blow-off port FrPa, a blow-off port switch damper 13b which opens and closes the passenger seat side foot blow-off port FtPa, and a blow-off port switch damper 14b which opens and closes the passenger seat side defroster blow-off port DfPa.

All of the blow-off port switch dampers 12a, 12b, 13a, 13b, 14a, 14b are connected to a direct-current motor M3 through a linkage mechanism (not shown). The opening degrees of the blow-off port switch dampers 12a, 12b, 13a, 13b, 14a, 14b are independently and respectively adjusted by rotation in the direct-current motor M3. The blow-off port switch dampers 12a, 12b, 13a, 13b, 14a, 14b are referred as a mode switch damper, because the conditioned air is blown off from the corresponding blow-off port according to a mode set by a mode switch on an instrument panel (not shown) of the vehicle.

The direct-current motors M1, M2, M3, M4 are connected to the control device 50 for the air-conditioner, and the rotations are controlled by the control device 50 for the air-conditioner. Moreover, as mentioned above, the centrifugal type blower 5 is also connected to the control device 50 for the air-conditioner, and the rotation is controlled by the control device 50 for the air-conditioner. Although detailed explanation is omitted, the control device 50 for the air-conditioner receives information such as a temperature in the passenger compartment input from an inside air temperature sensor, an outside air temperature input from an outside air temperature sensor, a temperature of the cooling water input from a water temperature sensor, a refrigerant temperature input from an evaporator sensor, a desired temperature input from an air-conditioner temperature control switch installed in the passenger compartment and information about the blow-off port from which air is blown off to the passenger compartment. The control device 50 for the air-conditioner conducts calculations based on the information, and determines a required blow-off temperature, an air amount, and an opening degree of each damper. A motor drive unit 30 and an air-conditioner ECU 40 to be mentioned later are included in the control device 50 for the air-conditioner.

Figure 2:
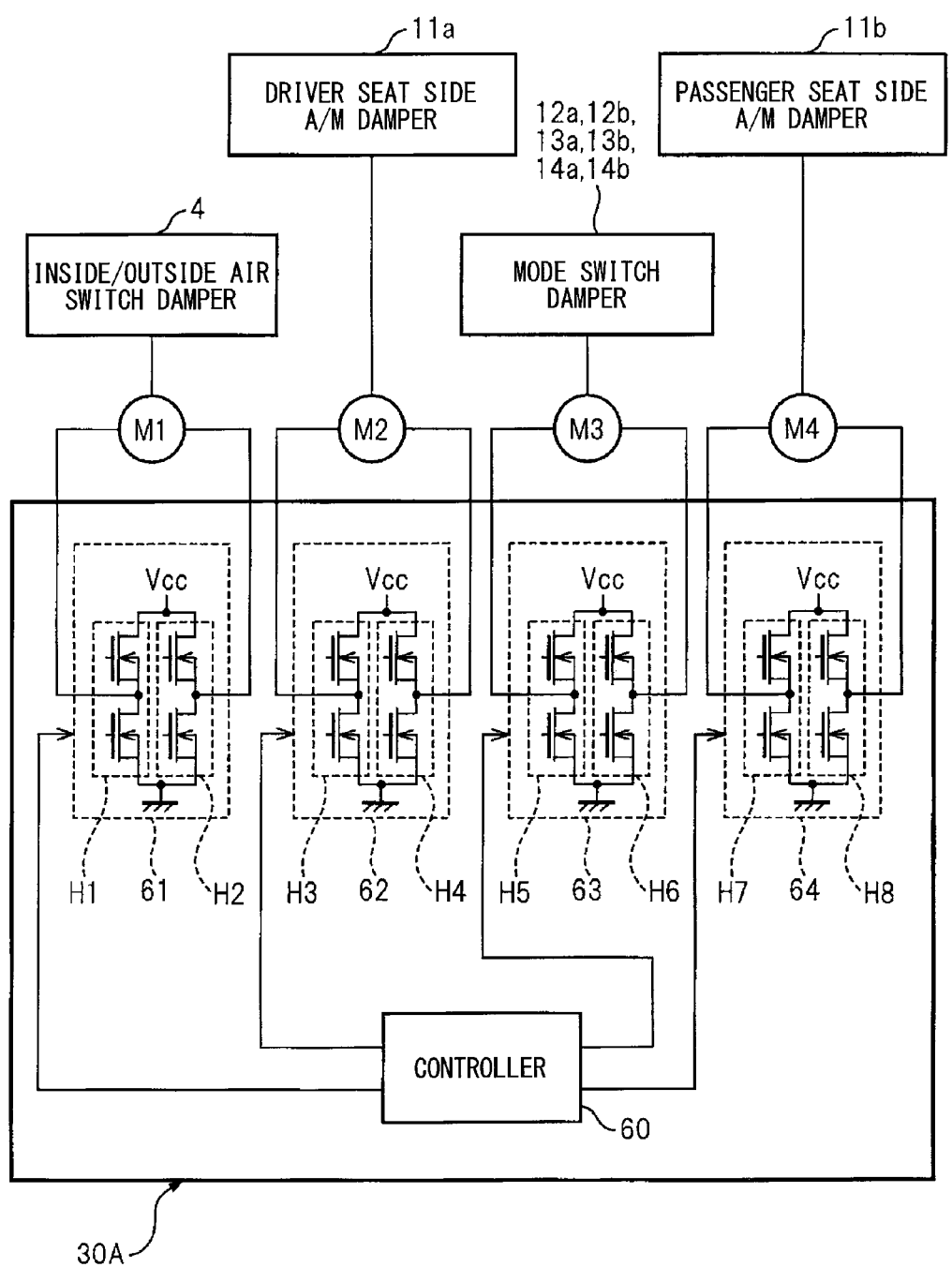
FIG. 2 is a circuit diagram illustrating a conventional motor drive unit.

Electric construction of a conventional motor drive unit 30A which was arranged in the control device 50 for the air-conditioner is explained using FIG. 2. As mentioned above, the direct-current motor M1 is connected to the inside/outside air switch damper 4, the direct-current motor M2 is connected to the driver seat side air mix damper 11a, the direct-current motor M3 is connected to the mode switch dampers 12a, 12b, 13a, 13b, 14a, 14b, and the direct-current motor M4 is connected to the passenger seat side air mix damper 11b. In the conventional motor drive unit 30A, the rotation of the direct-current motor M1 is controlled by a H bridged circuit 61, the rotation of the direct-current motor M2 is controlled by a H bridged circuit 62, the rotation of the direct-current motor M3 is controlled by a H bridged circuit 63, and the rotation of the direct-current motor M4 is controlled by a H bridged circuit 64.

Figure 4:
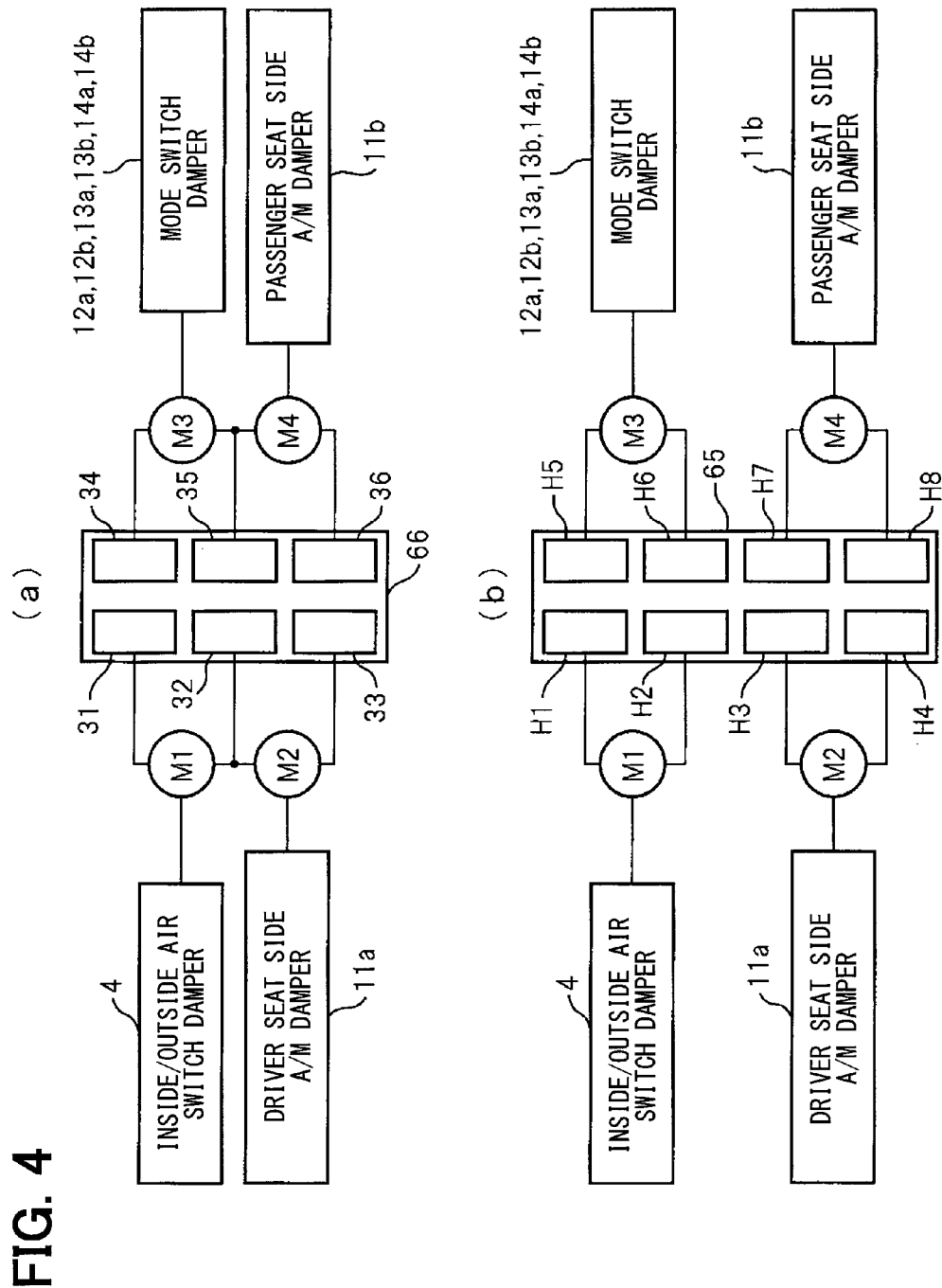
FIG. 4 (a) is a schematic view illustrating a connection between motors and an integrated circuit including the circuit shown in FIG. 3, of the motor drive unit of the embodiment, and FIG. 4 (b) is a schematic view illustrating a connection between motors and an integrated circuit including the circuit shown in FIG. 2, of the conventional motor drive unit.

That is, when there are four direct-current motors, four H bridged circuits are used, and each of the H bridged circuits 61-64 is controlled by a control part 60. Since each of the H bridged circuits 61, 62, 63, 64 (henceforth, 61-64) is constructed by two half bridged circuits, the conventional motor drive circuit 30A needed eight half bridged circuits H1, H2, H3, H4, H5, H6, H7, H8 (henceforth, H1-H8). For this reason, as shown in FIG. 4 (b), the size of an integrated circuit 65 including the four half bridged circuits H1-H8 becomes large, and the space efficiency was bad.

Figure 3:
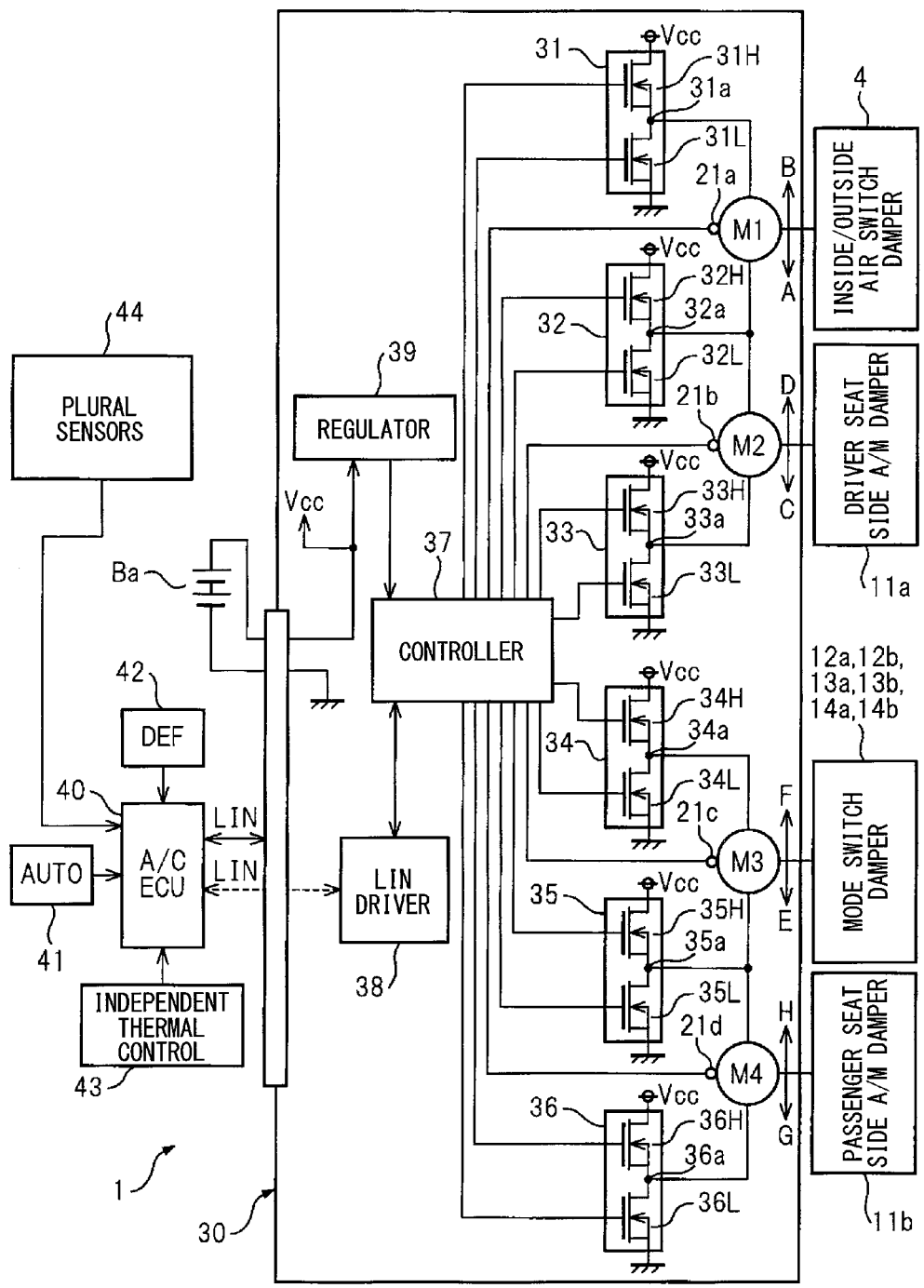
FIG. 3 is a circuit diagram illustrating a motor drive unit of the control device of the embodiment shown in FIG. 1.

In the present disclosure, the conventional motor drive unit 30A is improved, and an electric construction of the motor drive unit 30 of the vehicle air-conditioner 1 according to the present embodiment is explained using FIG. 3. The vehicle air-conditioner 1 is equipped with the electronic control unit 40 (which is described as A/C ECU in FIG. 3) other than the motor drive unit 30, and the electronic control unit 40 is later mentioned.

The motor drive unit 30 corresponds to a control device for an air-conditioner, and switches the inside/outside air switch damper 4, the driver seat side air mix damper 11a, the mode switch dampers 12a, 12b, 13a, 13b, 14a, 14b, and the passenger seat side air mix damper 11b using the direct-current motors M1, M2, M3, M4. As mentioned above, the inside/outside air switch damper 4 is opened and closed by the direct-current motor M1, the driver seat side air mix damper 11a is opened and closed by the direct-current motor M2, the mode switch dampers 12a, 12b, 13a, 13b, 14a, 14b are opened and closed by the direct-current motor M3, and the passenger seat side air mix damper 11b is opened and closed by the direct-current motor M4.

The motor drive unit 30 of the present embodiment includes the direct-current motors M1, M2, M3, M4, three half bridged circuits 31, 32, 33 which drive the direct-current motors M1, M2, three half bridged circuits 34, 35, 36 which drive the direct-current motors M3, M4, a control part 37, a local interconnection type network driver 38 (which is described as LIN driver in FIG. 3), and a regulator 39.

The half bridged circuit 31 includes a pair of transistors 31H, 31L. The transistors 31H, 31L are connected in series between a plus electrode (which is described as Vcc in FIG. 3 and henceforth referred as power source Vcc) of a battery Ba and a minus electrode (which is described as sign of the ground in FIG. 3) of the battery Ba. In this embodiment, electric field effect type transistor is used as the transistor 31H, 31L.

Similarly to the half bridged circuit 31, the half bridged circuit 32, 33, 34, 35, 36 includes a pair of transistors (32H, 32L), (33H, 33L), (34H, 34L), (35H, 35L), (36H, 36L) connected in series between the plus electrode of the battery Ba and the minus electrode of the battery Ba.

The direct-current motor M1 which drives the inside/outside air switch damper 4 is connected between a common connect point 31a of the transistors 31H, 31L of the half bridged circuit 31 and a common connect point 32a of the transistors 32H, 32L of the half bridged circuit 32. At the common connect point 31a, a source terminal of the transistor 31H and a drain terminal of the transistor 31L are connected with each other in the half bridged circuit 31. Moreover, at the common connect point 32a, a source terminal of the transistor 32H and a drain terminal of the transistor 32L are connected with each other in the half bridged circuit 32.

The direct-current motor M2 which drives the driver seat side air mix damper 11a is connected between a common connect point 32a of the transistors 32H, 32L of the half bridged circuit 32 and a common connect point 33a of the transistors 33H, 33L of the half bridged circuit 33. At the common connect point 33a, a source terminal of the transistor 33H and a drain terminal of the transistor 33L are connected with each other in the half bridged circuit 33.

The direct-current motor M3 which drives the mode switch dampers 12a, 12b, 13a, 13b, 14a, 14b is connected between a common connect point 34a of the transistors 34H, 34L of the half bridged circuit 34 and a common connect point 35a of the transistors 35H, 35L of the half bridged circuit 35. At the common connect point 34a, a source terminal of the transistor 34H and a drain terminal of the transistor 34L are connected with each other in the half bridged circuit 34. Moreover, at the common connect point 35a, a source terminal of the transistor 35H and a drain terminal of the transistor 35L are connected with each other in the half bridged circuit 35.

The direct-current motor M4 which drives the passenger seat side air mix damper 11b is connected between a common connect point 35a of the transistors 35H, 35L of the half bridged circuit 35 and a common connect point 36a of the transistors 36H, 36L of the half bridged circuit 36. At the common connect point 36a, a source terminal of the transistor 36H and a drain terminal of the transistor 36L are connected with each other in the half bridged circuit 36.

Thus, the rotational direction of the direct-current motor M1 is changed by the half bridged circuits 31 and 32, and the rotational direction of the direct-current motor M2 is changed by the half bridged circuits 32 and 33. Similarly, the rotational direction of the direct-current motor M3 is changed by the half bridged circuits 34 and 35, and the rotational direction of the direct-current motor M4 is changed by the half bridged circuits 35 and 36.

Therefore, in this embodiment, when there are four direct-current motors, the rotational direction of the four direct-current motors can be controlled only using the six half bridged circuits 31, 32, 33, 34, 35, 36 (henceforth, 31-36). Namely, when there are four direct-current motors, while the conventional motor drive circuit 30A requires the eight half bridged circuits H1-H8 as shown in FIG. 4 (b), the present embodiment requires only the six half bridged circuits 31-36 as shown in FIG. 4 (a). For this reason, the size of an integrated circuit 66 incorporating the six half bridged circuits 31-36 can be made smaller, and the space efficiency can be raised.

The electronic control unit 40 outputs a control signal to the control part 37 connected to the half bridged circuits 31-36, and the control signal is inputted into the control part 37 through the LIN driver 38. The control part 37 controls operation of the half bridged circuits 31-36 based on the inputted control signal. Furthermore, the control part 37 outputs signal outputted from potentiometers 21a, 21b, 21c, 21d to the electronic control unit 40 through the LIN driver 38. The potentiometers 21a, 21b, 21c, 21d are sensors which detect the rotation angle of the rotation axis of the direct-current motors M1, M2, M3, M4, respectively.

The LIN driver 38 communicates with the electronic control unit 40 through the in-vehicle LAN, and constitutes an interface circuit between the electronic control unit 40 and the control part 37. A local interconnect network (LIN) is used as communications protocol of the in-vehicle LAN of this embodiment. The regulator 39 outputs a fixed power supply voltage (for example, 5V) to the control part 37 etc. based on a voltage between the plus electrode and the minus electrode of the battery Ba, so as to supply electric power to the control part 37.

The electronic control unit 40 is a known electronic control unit including a memory, a microcomputer, etc. The electronic control unit 40 executes a control process for controlling the direct-current motors M1, M2, M3, M4 based on the output signal of switches 41, 42, 43, the output signal of plural sensors 44, and the output signal of the potentiometers 21a, 21b, 21c, 21d.

The switch 41 is a switch for setting an automatic air-conditioning mode which controls automatically the temperature of air blown off to the passenger compartment, and is indicated as AUTO in FIG. 3. The switch 42 is a switch for setting a defroster mode, and is indicated as DEF in FIG. 3. The switch 43 is a switch for setting an independent thermal control mode, and is described as independent thermal control in FIG. 3. At the independent thermal control mode, the blow-off air temperature from the driver seat side blow-off ports FrDr, FtDr, DfDr and the blow-off air temperature from the passenger seat side blow-off ports FrPa, FtPa, DfPa, which are shown in FIG. 1, are respectively controlled independently from each other.

The plural sensors 44 may be, for example, an outside air temperature sensor which detects the temperature of air outside the passenger compartment, a solar sensor which detects a solar radiation degree in the passenger compartment, a driver seat side temperature setting unit through which a preset temperature is set for the driver seat by an occupant, a passenger seat side temperature setting unit through which a preset temperature is set for the passenger seat by an occupant, and a temperature sensor which detects the temperature of engine cooling water.

Next, operation of the half bridged circuit 31-36 which rotates the direct-current motor M1 which opens and closes the inside/outside air switch damper 4, the direct-current motor M2 which opens and closes the driver seat side air mix damper 11a, the direct-current motor M3 which opens and closes the mode switch dampers 12a, 12b, 13a, 13b, 14a, 14b, and the direct-current motor M4 which opens and closes the passenger seat side air mix damper 11b in a normal direction or a reverse direction is explained for each damper. In addition, from FIG. 5 to FIG. 12 in which each direct-current motor and each damper are described, the ON/OFF state of each transistor is illustrated by ON/OFF of a switch.

(i) Opening and Closing of an Inside/Outside Air Switch Damper (i-a) Normal Rotation of the Direct-Current Motor M1 (Direction of A: Outside Air Mode)

Figure 5:
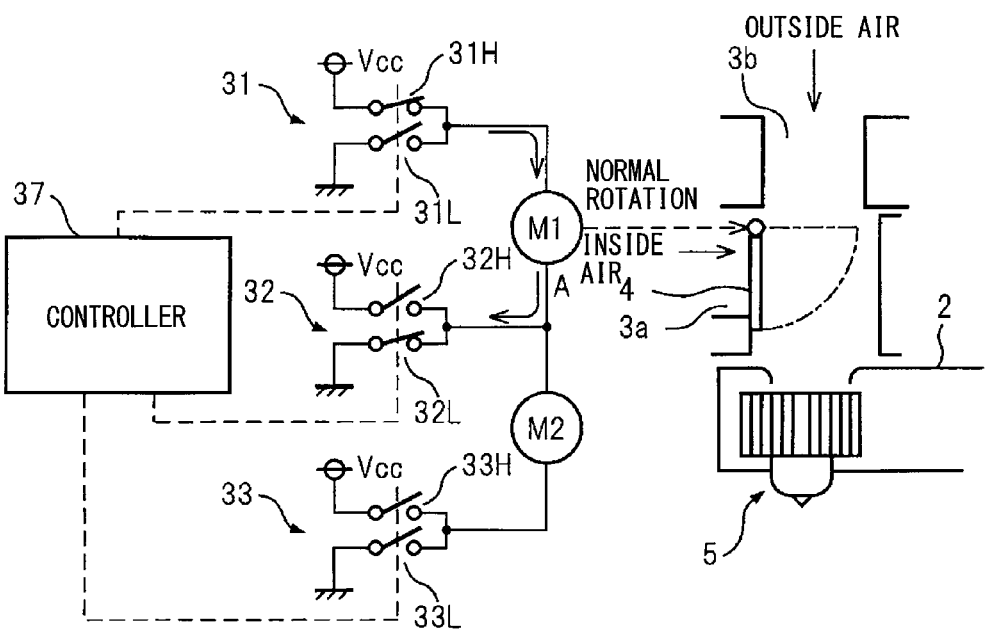
FIG. 5 illustrates a control of opening and closing an inside/outside air switch damper by a control device, in which (a) is an explanatory diagram illustrating operation of half bridged circuit by the control device when outside air is drawn and (b) is an explanatory diagram illustrating operation of the half bridged circuit by the control device when inside air is drawn.
Figure 5:
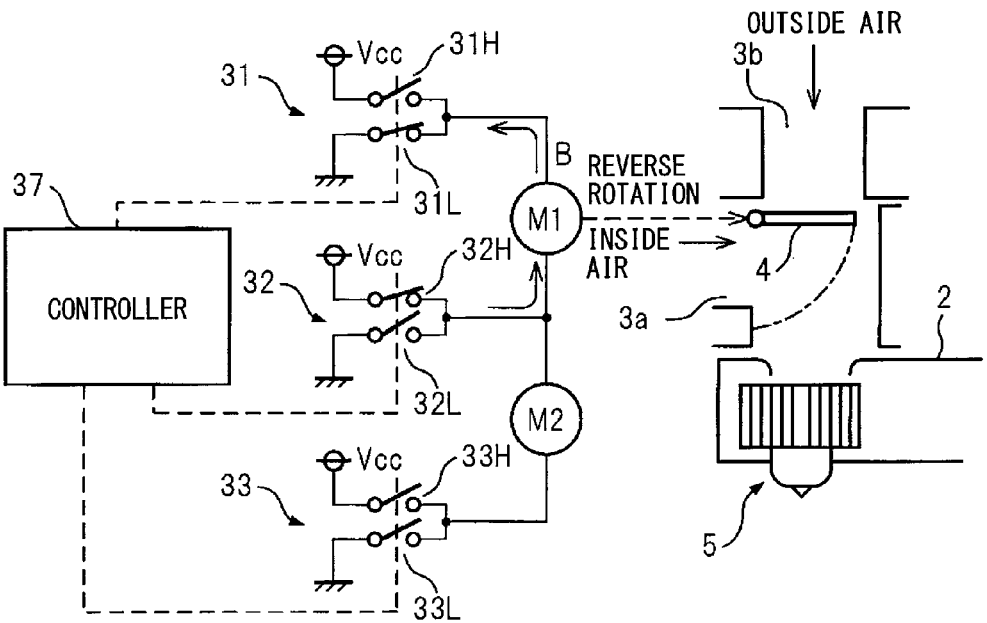

FIG. 5 (a) illustrates a state of the circuit and a state of the inside/outside air switch damper 4 when the direct-current motor M1 has normal rotation. At this time, the control part 37 turns on the transistor 31H of the half bridged circuit 31, turns off the transistor 31L, turns off the transistor 32H of the half bridged circuit 32, turns on the transistor 32L, and turns off both the transistors 33H and 33L of the half bridged circuit 33.

Accordingly, current from the power supply Vcc flows in the direction of A from the transistor 31H of the half bridged circuit 31 to the ground through the direct-current motor M1 and the transistor 32L of the half bridged circuit 32. At this time, the direct-current motor M2 is in the stopped state, and the direct-current motor M1 is rotated. Here, the rotational direction of the direct-current motor M1 is defined as a normal direction when current flows in the direction of A. When the direct-current motor M1 has normal rotation, the inside/outside air switch damper 4 is rotated through the linkage mechanism to close the inside air feed port 3a, thereby the mode is switched from the inside air mode to the outside air mode.

At the inside air mode, the outside air feed port 3b is closed and the inside air feed port 3a is opened by the inside/outside air switch damper 4, so as to introduce air inside the passenger compartment. At the outside air mode, the inside air feed port 3a is closed and the outside air feed port 3b is opened by the inside/outside air switch damper 4, so as to introduce air outside the passenger compartment.

(i-b) Reverse Rotation of the Direct-Current Motor M1 (Direction of B: Inside Air Mode)

FIG. 5 (b) illustrates a state of the circuit and a state of the inside/outside air switch damper 4 when the direct-current motor M1 has reverse rotation. At this time, the control part 37 turns off the transistor 31H of the half bridged circuit 31, turns on the transistor 31L, turns on the transistor 32H of the half bridged circuit 32, turns off the transistor 32L, and turns off both the transistors 33H and 33L of the half bridged circuit 33.

Accordingly, current from the power supply Vcc flows in the direction of B from the transistor 32H of the half bridged circuit 32 to the ground through the direct-current motor M1 and the transistor 31L of the half bridged circuit 31. At this time, the direct-current motor M2 is in the stopped state, and the direct-current motor M1 is rotated. Here, the rotational direction of the direct-current motor M1 is defined as a reverse direction when current flows in the direction of B. When the direct-current motor M1 is reversed, the inside/outside air switch damper 4 is rotated through the linkage mechanism to close the outside air feed port 3b, thereby the mode is switched from the outside air mode to the inside air mode.

(ii) Opening and Closing of a Driver Seat Side Air Mix Damper (ii-a) Normal Rotation of the Direct-Current Motor M2 (Direction of C: MAX COOL Mode)

Figure 6:
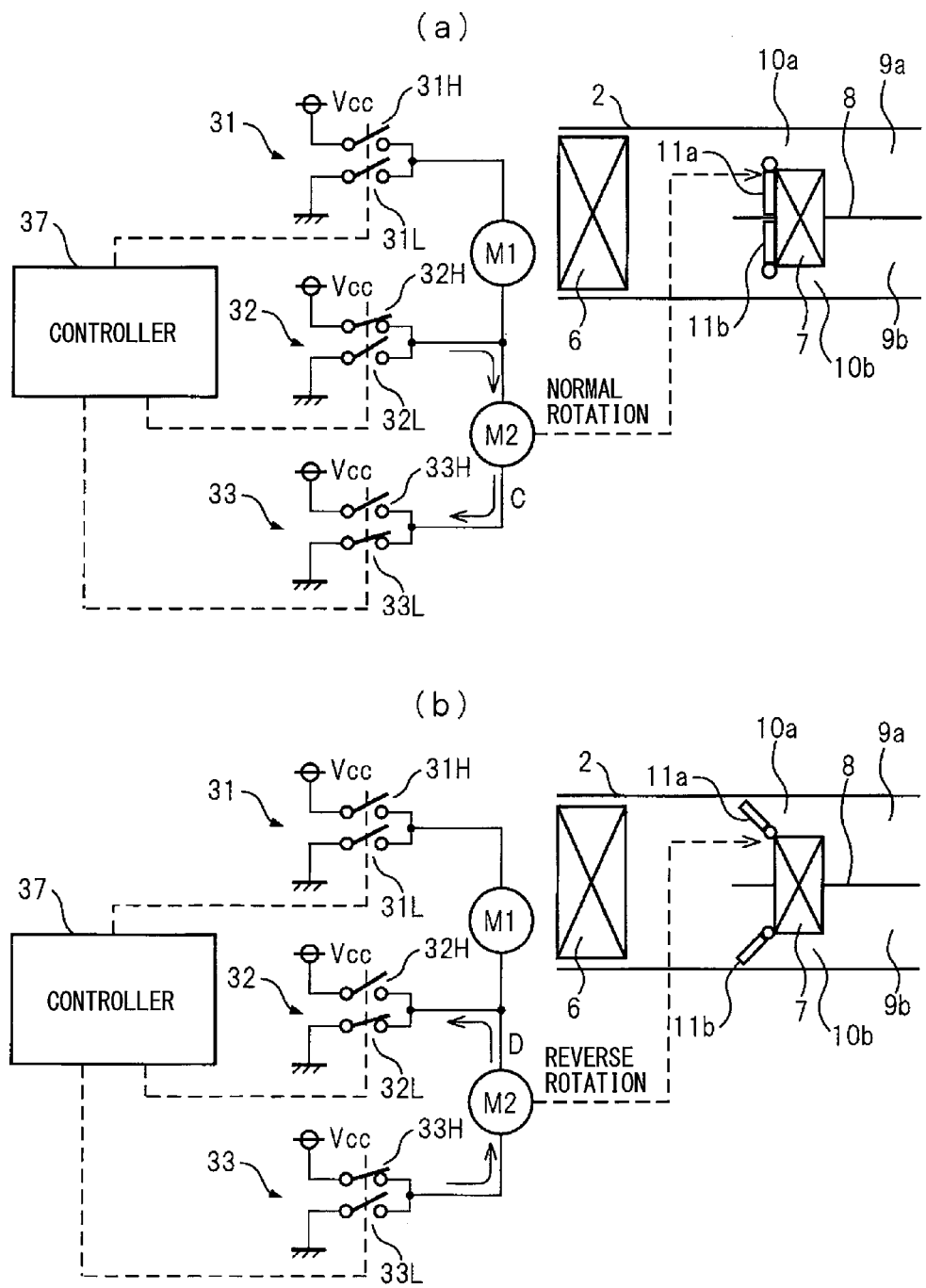
FIG. 6 illustrates a control of opening and closing a driver seat side air mix damper by a control device, in which (a) is an explanatory diagram illustrating operation of half bridged circuit by the control device at a time of MAX COOL and (b) is an explanatory diagram illustrating operation of the half bridged circuit by the control device at a time of MAX HOT.

FIG. 6 (a) illustrates a state of the circuit and a state of the air mix damper 11a when the direct-current motor M2 has normal rotation. At this time, the control part 37 turns off both the transistors 31H and 31L of the half bridged circuit 31, turns on the transistor 32H of the half bridged circuit 32, turns off the transistor 32L, turns off the transistor 33H of the half bridged circuit 33, and turns on the transistor 33L.

Accordingly, current from the power supply Vcc flows in the direction of C from the transistor 32H of the half bridged circuit 32 to the ground through the direct-current motor M2 and the transistor 33L of the half bridged circuit 33. At this time, the direct-current motor M1 is in the stopped state, and the direct-current motor M2 is rotated. Here, the rotational direction of the direct-current motor M2 is defined as a normal direction when current flows in the direction of C. When the direct-current motor M2 has normal rotation, the driver seat side air mix damper 11a is rotated through the linkage mechanism so as to cover the upstream side of the heater core 7 adjacent to the driver seat side passage 9a. As a result, all the air which flows through the driver seat side passage 9a after cooled by the evaporator 6 flows through the driver seat side passage 9a via the bypass channel 10a. The air which flows through the driver seat side passage 9a is not heated with the heater core 7, and is in the max cool state, so the state of the air at this time is called as MAX COOL state.

In addition, in FIG. 6 (a), the passenger seat side air mix damper 11b located on the passenger seat side passage 9b is also rotated to cover the heater core 7 adjacent to the passenger seat side passage 9b, so the passenger seat side passage 9b is also in the MAX COOL state. The operation of the passenger seat side air mix damper 11b which will be mentioned later can be executed independently from the operation of the driver seat side air mix damper 11a.

(ii-b) Reverse Rotation of the Direct-Current Motor M2 (Direction of D: MAX HOT mode)

FIG. 6 (b) illustrates a state of the circuit and a state of the air mix damper 11a when the direct-current motor M2 has reverse rotation. At this time, the control part 37 turns off both the transistors 31H and 31L of the half bridged circuit 31, turns off the transistor 32H of the half bridged circuit 32, turns on the transistor 32L, turns on the transistor 33H of the half bridged circuit 33, and turns off the transistor 33L.

Accordingly, current from the power supply Vcc flows in the direction of D from the transistor 33H of the half bridged circuit 33 to the ground through the direct-current motor M2 and the transistor 32L of the half bridged circuit 32. At this time, the direct-current motor M1 is in the stopped state, and the direct-current motor M2 is rotated. Here, the rotational direction of the direct-current motor M2 is defined as a reverse direction when current flows in the direction of D. When the direct-current motor M2 is reversed, the driver seat side air mix damper 11a is rotated through the linkage mechanism to open the heater core 7 adjacent to the driver seat side passage 9a and to close the bypass channel 10a. As a result, all the air which flows through the driver seat side passage 9a after cooled by the evaporator 6 flows into the driver seat side passage 9a through the heater core 7. All the air which flows through the driver seat side passage 9a is heated with the heater core 7, and is the max hot state, so the state of the air at this time is called as MAX HOT state.

(iii) Simultaneous Opening/Closing of an Inside/Outside Air Switch Damper and a Driver Seat Side Air Mix Damper (iii-a) Normal Rotation (Direction of A) of the Direct-Current Motor M1, Reverse Rotation (Direction of D) of the Direct-Current Motor M2

Figure 7:
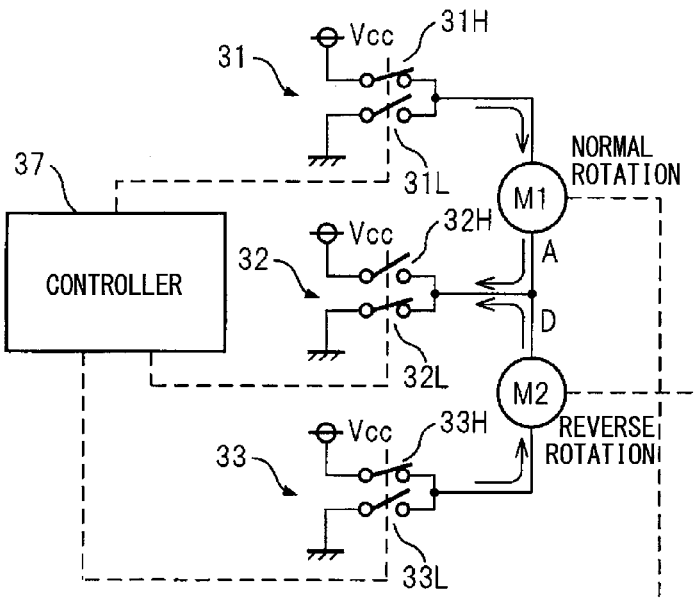
FIG. 7 is an explanatory diagram illustrating operation of each half bridged circuit by the control device when the inside/outside air switch damper is switched to draw outside air and when the driver seat side air mix damper is switched to MAX HOT state using three half bridged circuits.
Figure 7:
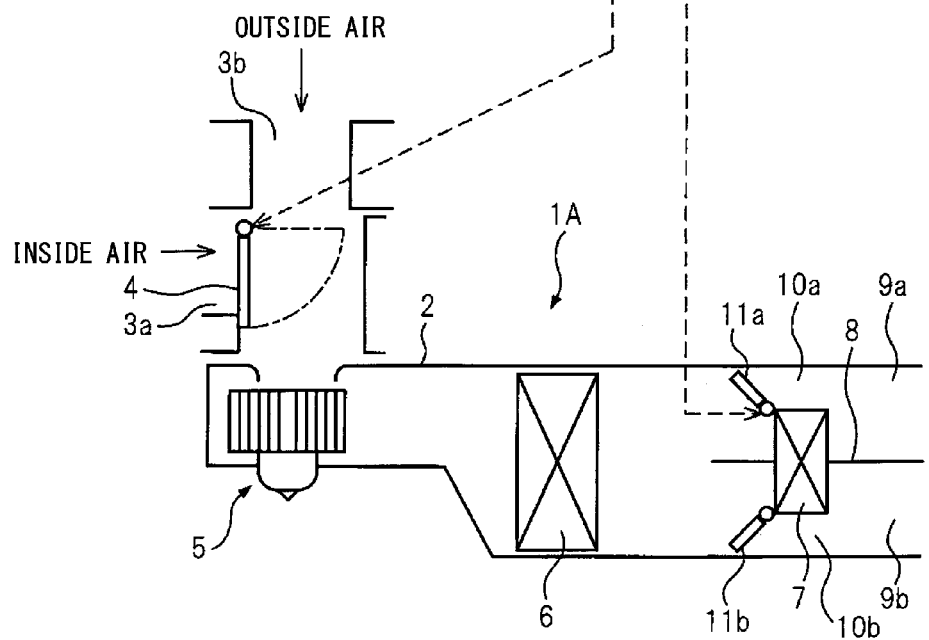

FIG. 7 illustrates a state of the circuit and states of the inside/outside air switch damper 4 and the air mix damper 11a when the direct-current motor M1 has normal rotation and when the direct-current motor M2 has reverse rotation. At this time, the control part 37 turns on the transistor 31H of the half bridged circuit 31, turns off the transistor 31L, turns off the transistor 32H of the half bridged circuit 32, turns on the transistor 32L, turns on the transistor 33H of the half bridged circuit 33, and turns off the transistor 33L. This state is shown in FIG. 7.

Accordingly, current from the power supply Vcc flows in the direction of A from the transistor 31H of the half bridged circuit 31 to the ground through the direct-current motor M1 and the transistor 32L of the half bridged circuit 32. Since the current flows in the direction of A, the rotational direction of the direct-current motor M1 is the normal direction, and the inside/outside air switch damper 4 is rotated through the linkage mechanism, thereby the mode is switched from the inside air mode to the outside air mode.

Moreover, current from the power supply Vcc flows also in the direction of D from the transistor 33H of the half bridged circuit 33 to the ground through the direct-current motor M2 and the transistor 32L of the half bridged circuit 32. Since the current flows in the direction of D, the rotational direction of the direct-current motor M2 is the reverse direction, and the driver seat side air mix damper 11a is rotated through the linkage mechanism to open the heater core 7 adjacent to the driver seat side passage 9a and to close the bypass channel 10a. As a result, all the air which flows through the driver seat side passage 9a after cooled by the evaporator 6 flows into the driver seat side passage 9a through the heater core 7. All the air which flows through the driver seat side passage 9a is heated with the heater core 7, so the air is in the MAX HOT state.

Figure 13:
FIG. 13 (a) is an explanatory diagram illustrating a relationship between an inside air mode and an outside air mode relative to a rotational direction of a direct-current motor which drives an inside/outside air switch damper at an inside/outside air mode, FIG. 13 (b) is an explanatory diagram illustrating a relationship between MAX COOL and MAX HOT relative to a rotational direction of a direct-current motor which drives a driver seat side air mix damper, FIG. 13 (c) is an explanatory diagram illustrating a relationship between a blow-off port mode and a rotational direction of a direct-current motor, and FIG. 13 (d) is an explanatory diagram illustrating a relationship between MAX COOL and MAX HOT relative to a rotational direction of a direct-current motor which drives a passenger seat side air mix damper.
Figure 13:
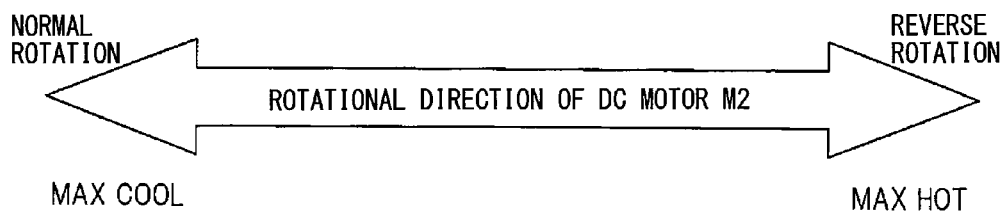
Figure 13:
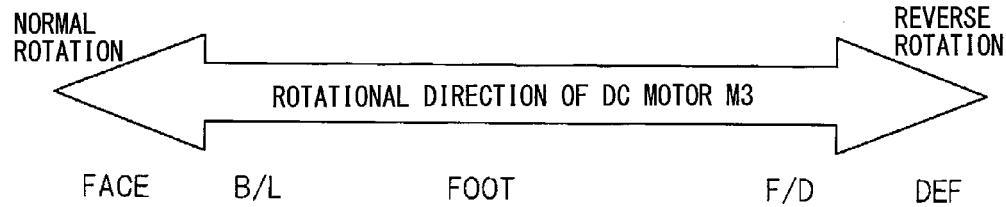
Figure 13:
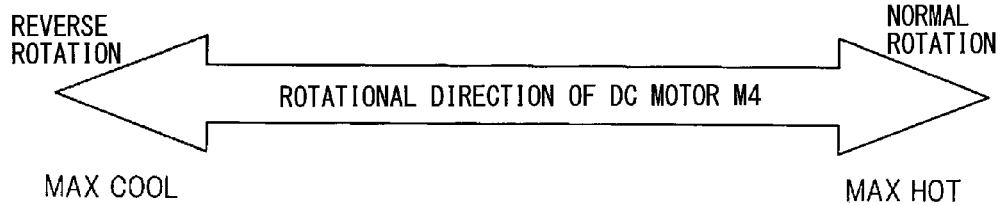

The state shown in FIG. 7 corresponds to a mode set by an occupant of the vehicle, for example, to prevent the window fogging in a heating operation. At this mode, as shown in FIG. 13 (*a*), when the direct-current motor M1 is made to have normal rotation to close the inside air feed port 3a with the inside/outside air damper 4 so as to set the outside air mode, as shown in FIG. 13 (*b*), the direct-current motor M2 is simultaneously made to have reverse rotation to close the bypass channel 10a with the driver seat side air mix damper 11a, so as to set the MAX HOT state (described as MAX HOT in drawings). As a result, it becomes possible to raise both safety and heating performance.

(iii-b) Reverse Rotation (Direction of B) of the Direct-Current Motor M1, Normal Rotation (Direction of C) of the Direct-Current Motor M2

Figure 8:
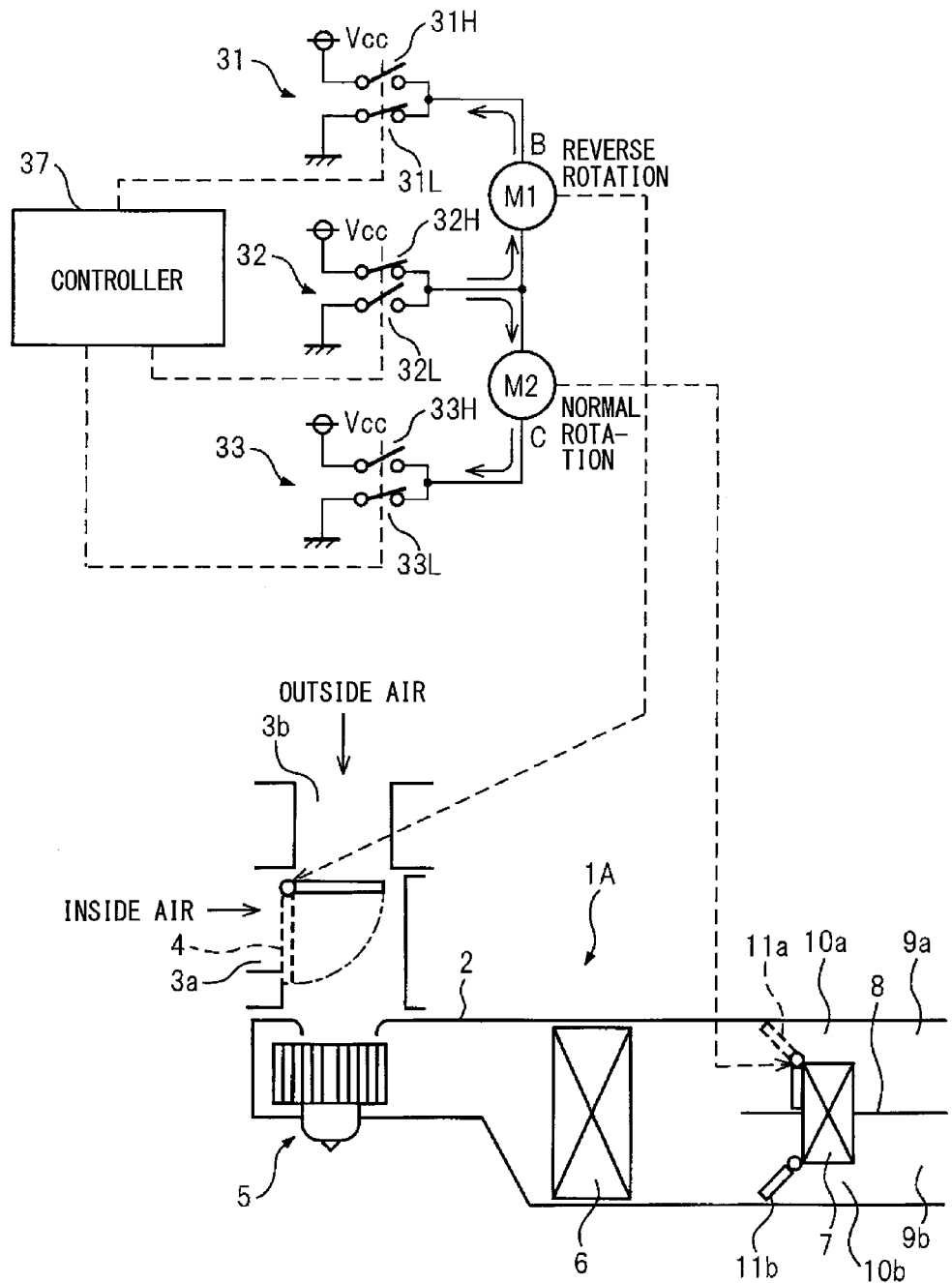
FIG. 8 is an explanatory diagram illustrating operation of each half bridged circuit by the control device when the inside/outside air switch damper is switched to draw inside air and when the driver seat side air mix damper is switched to MAX COOL state using three half bridged circuits.

FIG. 8 illustrates a state of the circuit and states of the inside/outside air switch damper 4 and the air mix damper 11a when the direct-current motor M1 has reverse rotation and when the direct-current motor M2 has normal rotation. At this time, the control part 37 turns off the transistor 31H of the half bridged circuit 31, turns on the transistor 31L, turns on the transistor 32H of the half bridged circuit 32, turns off the transistor 32L, turns off the transistor 33H of the half bridged circuit 33, and turns on the transistor 33L.

Accordingly, current from the power supply Vcc flows in the direction of B from the transistor 32H of the half bridged circuit 32 to the ground through the direct-current motor M1 and the transistor 31L of the half bridged circuit 31. By the current which flows in the direction of B, the rotational direction of the direct-current motor M1 becomes the reverse direction, and the inside/outside air switch damper 4 is rotated through the linkage mechanism to close the outside air feed port 3b, thereby the mode is switched from the outside air mode to the inside air mode.

Moreover, the current from the power supply Vcc flows also in the direction of C from the transistor 32H of the half bridged circuit 32 to the ground through the direct-current motor M2 and the transistor 33L of the half bridged circuit 33. By the current which flows in the direction of C, the rotational direction of the direct-current motor M2 becomes the normal direction, and the driver seat side air mix damper 11a is rotated through the linkage mechanism to cover the upstream side of the heater core 7 adjacent to the driver seat side passage 9a. As a result, all the air which flows through the driver seat side passage 9a after cooled by the evaporator 6 flows into the driver seat side passage 9a through the bypass channel 10a. Since the air which flows through the driver seat side passage 9a is not heated with the heater core 7, the air is made in the MAX COOL state.

The state shown in FIG. 8 represents a mode set, for example, by an occupant of the vehicle in a cooling operation. In this mode, in order to reduce the thermal load in the cooling operation, when the direct-current motor M1 is reversed to close the outside air feed port 3b with the inside/outside air damper 4 so as to set the inside air mode, the direct-current motor M2 is simultaneously made to have normal rotation to close the air inflow side of the heater core 7 with the driver seat side air mix damper 11a. In this state, all the air which flows through the driver seat side passage 9a after cooled by the evaporator 6 flows through the bypass channel 10a. Namely, as shown in FIG. 13 (*a*), when the direct-current motor M1 is reversed to set the inside air mode, as shown in FIG. 13 (*b*), the direct-current motor M2 is made to have normal rotation to set the MAX COOL state (described as MAX COOL in the drawing). As a result, the cooling performance can be improved, and it becomes possible to quickly cool.

(iv) Opening and Closing of a Blow-Off Port Switch Damper

The mode switch damper (blow-off port switch dampers) 12a, 12b, 13a, 13b, 14a, 14b which opens and closes the blow-off port FrDr, FtDr, DfDr, FrPa, FtPa, DfPa is opened and closed by the single direct-current motor M3. Here, before explaining the switch among the dampers by the direct-current motor M3, the mode switch damper 12a, 12b, 13a, 13b, 14a, 14b itself is explained.

The mode switch damper 12a, 12b, 13a, 13b, 14a, 14b is opened and closed according to the mode among a face mode, a bilevel mode, a foot mode, a foot/def mode, and a def mode, to switch the blow-off port. The operation of the mode switch damper 12a, 12b, 13a, 13b, 14a, 14b at each mode is as follows. The face mode may be described as FACE, the bilevel mode may be described as B/L, the foot mode may be described as FOOT, the foot/def mode may be described as F/D, and the def mode may be described as DEF.

In the face mode, the face blow-off port FrDr, FrPa is opened by the mode switch damper 12a, 12b, the foot blow-off port FtDr, FtPa is closed by the mode switch damper 13a, 13b, and the defroster blow-off port DfDr, DfPa is closed by the mode switch damper 14a, 14b.

In the bilevel mode, the face blow-off port FrDr, FrPa is opened by the mode switch damper 12a, 12b, the foot blow-off port FtDr, FtPa is opened by the mode switch damper 13a, 13b, and the defroster blow-off port DfDr, DfPa is closed by the mode switch damper 14a, 14b.

In the foot mode, the face blow-off port FrDr, FrPa is closed by the mode switch damper 12a, 12b, the foot blow-off port FtDr, FtPa is opened by the mode switch damper 13a, 13b, and the defroster blow-off port DfDr, DfPa is slightly opened by the mode switch damper 14a, 14b.

In the foot/def mode, the face blow-off port FrDr, FrPa is closed by the mode switch damper 12a, 12b, the foot blow-off port FtDr, FtP is opened by the mode switch damper 13a, 13b, and the defroster blow-off port DfDr, DfPa is opened by the mode switch damper 14a, 14b.

In the def mode, the face blow-off port FrDr, FrPa is closed by the mode switch damper 12a, 12b, the foot blow-off port FtDr, FtPa is closed by the mode switch damper 13a, 13b, and the defroster blow-off port DfDr, DfPa is opened by the mode switch damper 14a, 14b.

The linkage mechanism is constituted so that the blow-off port mode is changed in order of the face mode, the bilevel mode, the foot mode, the foot/def mode, and the def mode when the direct-current motor M3 is rotated in the normal direction. On the other hand, the linkage mechanism is constituted so that the blow-off port mode is changed in order of the def mode, the foot/def mode, the foot mode, the bilevel mode, and the face mode when the direct-current motor M3 is rotated in the reverse direction. FIG. 13 (c) illustrates the correspondence between the rotational direction of the direct-current motor M3 and a switch in each blow-off port. When rotation of the direct-current motor M3 is transmitted to the mode switch damper 12a, 12b, 13a, 13b, 14a, 14b through the linkage mechanism, one of the blow-off port modes is carried out among the face mode (FACE), the bilevel mode (B/L), the foot mode (FOOT), the foot/def mode (F/D), and the def mode (DEF).

(iv-a) Normal Rotation (Direction of E) of the Direct-Current Motor M3

Figure 9:
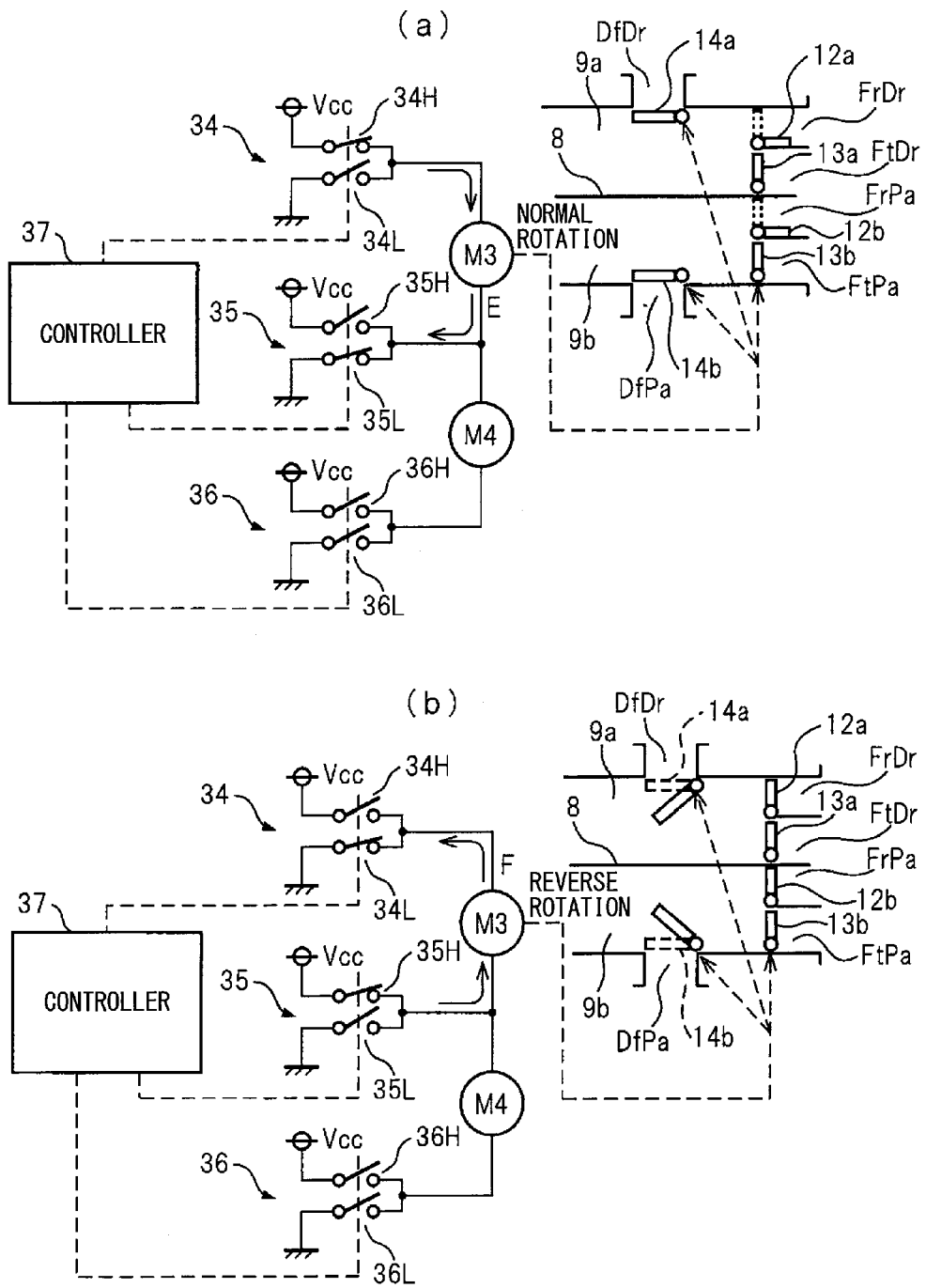
FIG. 9 illustrates a control of opening and closing blow-off port switch damper by a control device, in which (a) is an explanatory diagram illustrating operation of half bridged circuit by the control device when all of the blow-off port switch dampers are closed and (b) is an explanatory diagram illustrating operation of the half bridged circuit by the control device when one of the blow-off port switch dampers is opened.

FIG. 9 (a) illustrates a state of the circuit and states of the mode switch dampers 12a, 12b, 13a, 13b, 14a, 14b when the direct-current motor M3 has normal rotation. At this time, the control part 37 turns on the transistor 34H of the half bridged circuit 34, turns off the transistor 34L, turns off the transistor 35H of the half bridged circuit 35, turns on the transistor 35L, and turns off both the transistors 36H and 36L of the half bridged circuit 36. This state is shown in FIG. 9 (a).

Accordingly, current from the power supply Vcc flows in the direction of E from the transistor 34H of the half bridged circuit 34 to the ground through the direct-current motor M3 and the transistor 35L of the half bridged circuit 35. At this time, the direct-current motor M4 is in the stopped state, and the direct-current motor M3 is rotated. The rotational direction of the direct-current motor M3 is defined as normal direction when current flows in the direction of E. When the direct-current motor M3 has normal rotation, at least one of the mode switch dampers 12a, 12b, 13a, 13b, 14a, 14b is rotated through the linkage mechanism. FIG. 9 (a) shows, for example, the face mode. In the face mode, the face blow-off port FrDr, FrPa is opened by the mode switch damper 12a, 12b, the foot blow-off port FtDr, FtPa is closed by the mode switch damper 13a, 13b, and the defroster blow-off port DfDr, DfPa is closed by the mode switch damper 14a, 14b.

(iv-b) Reverse Direction (Direction of F) of the Direct-Current Motor M3

FIG. 9 (b) illustrates a state of the circuit and states of the mode switch dampers 12a, 12b, 13a, 13b, 14a, 14b when the direct-current motor M3 has reverse rotation. At this time, the control part 37 turns off the transistor 34H of the half bridged circuit 34, turns on the transistor 34L, turns on the transistor 35H of the half bridged circuit 35, turns off the transistor 35L, and turns off both the transistors 36H and 36L of the half bridged circuit 36.

Accordingly, current from the power supply Vcc flows in the direction of F from the transistor 35H of the half bridged circuit 35 to the ground through the direct-current motor M3 and the transistor 34L of the half bridged circuit 34. At this time, the direct-current motor M4 is in the stopped state, and the direct-current motor M3 is rotated. In case the rotational direction of the direct-current motor M3 is defined as reverse direction when current flows in the direction of F, the mode switch damper 12a, 12b is rotated in a direction closing the face blow-off port FrDr, FrPa through the linkage mechanism, and at least one of the remaining mode switch dampers 13a, 13b, 14a, 14b is rotated in a direction opening the foot blow-off port FtDr, FtPa or the defroster blow-off port DfDr, DfPa.

FIG. 9 (b) shows a state where the mode is changed from the face mode to the def mode, by the reverse rotation of the direct-current motor M3. In the def mode, the face blow-off port FrDr, FrPa is closed by the mode switch damper 12a, 12b, the foot blow-off port FtDr, FtPa is closed by the mode blow-off port switch damper 13a, 13b, and the defroster blow-off port DfDr, DfPa is opened by the mode switch damper 14a, 14b.

(v) Opening and Closing of a Passenger Seat Side Air Mix Damper (v-a) Normal Rotation of the Direct-Current Motor M4 (Direction of G: MAX HOT Mode)

Figure 10:
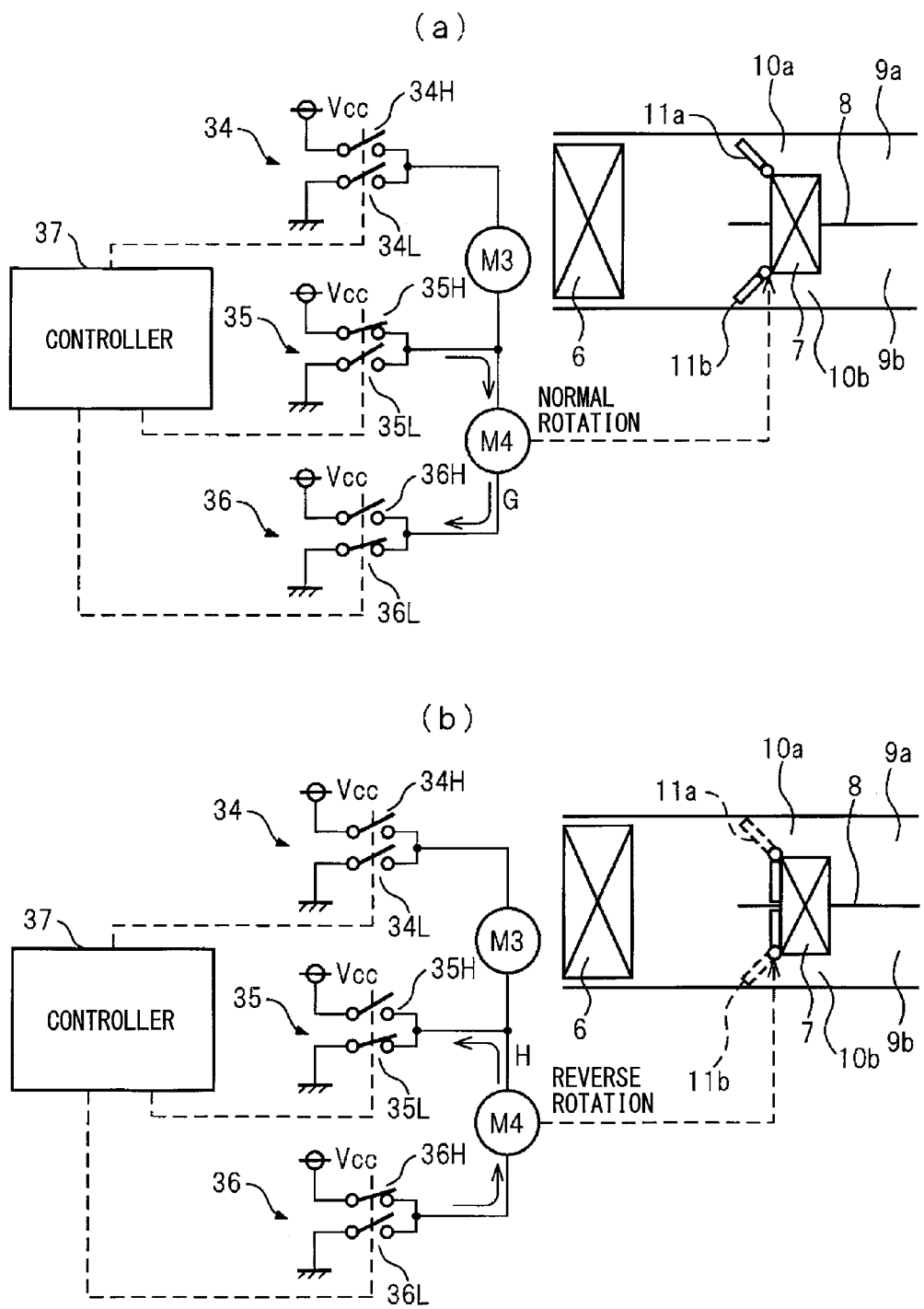
FIG. 10 illustrates a control of opening and closing a passenger seat side air mix damper by a control device, in which (a) is an explanatory diagram illustrating operation of half bridged circuit by the control device at a time of MAX HOT and (b) is an explanatory diagram illustrating operation of the half bridged circuit by the control device at a time of MAX COOL.

FIG. 10 (a) illustrates a state of the circuit and a state of the air mix damper 11b when the direct-current motor M4 has normal rotation. At this time, the control part 37 turns off both the transistors 34H and 34L of the half bridged circuit 34, turns on the transistor 35H of the half bridged circuit 35, turns off the transistor 35L, turns off the transistor 36H of the half bridged circuit 36, and turns on the transistor 36L.

Accordingly, current from the power supply Vcc flows in the direction of G from the transistor 35H of the half bridged circuit 35 to the ground through the direct-current motor M4 and the transistor 36L of the half bridged circuit 36. At this time, the direct-current motor M3 is in the stopped state, and the direct-current motor M4 is rotated. The rotational direction of the direct-current motor M4 is defined as normal direction when current flows in the direction of G. When the direct-current motor M4 is rotated in the normal direction, the passenger seat side air mix damper 11b is rotated through the linkage mechanism to open the heater core 7 adjacent to the passenger seat side passage 9b and to close the bypass channel 10b. As a result, all the air which flows through the passenger seat side passage 9b after cooled by the evaporator 6 flows into the passenger seat side passage 9b through the heater core 7. Since all the air which flows through the passenger seat side passage 9b is heated with the heater core 7, the air is in the MAX HOT state. In this embodiment, the driver seat side air mix damper 11a located in the driver seat side passage 9a is also rotated to open the heater core 7 adjacent to the driver seat side passage 9a and to close the bypass channel 10a.

(v-b) Reverse Rotation of the Direct-Current Motor M4 (Direction of H: MAX COOL Mode)

FIG. 10 (b) illustrates a state of the circuit and a state of the air mix damper 11b when the direct-current motor M4 is rotated in the reverse direction. At this time, the control part 37 turns off both the transistors 34H and 34L of the half bridged circuit 34, turns off the transistor 35H of the half bridged circuit 35, turns on the transistor 35L, turns on the transistor 36H of the half bridged circuit 36, and turns off the transistor 36L.

Accordingly, current from the power supply Vcc flows in the direction of H from the transistor 36H of the half bridged circuit 36 to the ground through the direct-current motor M4 and the transistor 35L of the half bridged circuit 35. At this time, the direct-current motor M3 is in the stopped state, and the direct-current motor M4 is rotated. The rotational direction of the direct-current motor M4 is defined as reverse direction when current flows in the direction of H. When the direct-current motor M4 is reversed, the passenger seat side air mix damper 11b is rotated through the linkage mechanism to cover the heater core 7 adjacent to the passenger seat side passage 9b. As a result, all the air which flows through the passenger seat side passage 9b after cooled by the evaporator 6 flows into the passenger seat side passage 9b through the bypass channel 10b. Since the air which flows through the passenger seat side passage 9b is not heated with the heater core 7, the air is in the MAX COOL state. In this embodiment, the driver seat side air mix damper 11a in the driver seat side passage 9a is also rotated to cover the heater core 7 adjacent to the driver seat side passage 9a and to open the bypass channel 10a.

(vi) Simultaneous Opening/Closing of the Blow-Off Port Switch Damper and the Driver Seat Side Air Mix Damper (vi-a) Normal Rotation (Direction of E) of the Direct-Current Motor M3, Reverse Rotation (Direction of H) of the Direct-Current Motor M4

Figure 11:
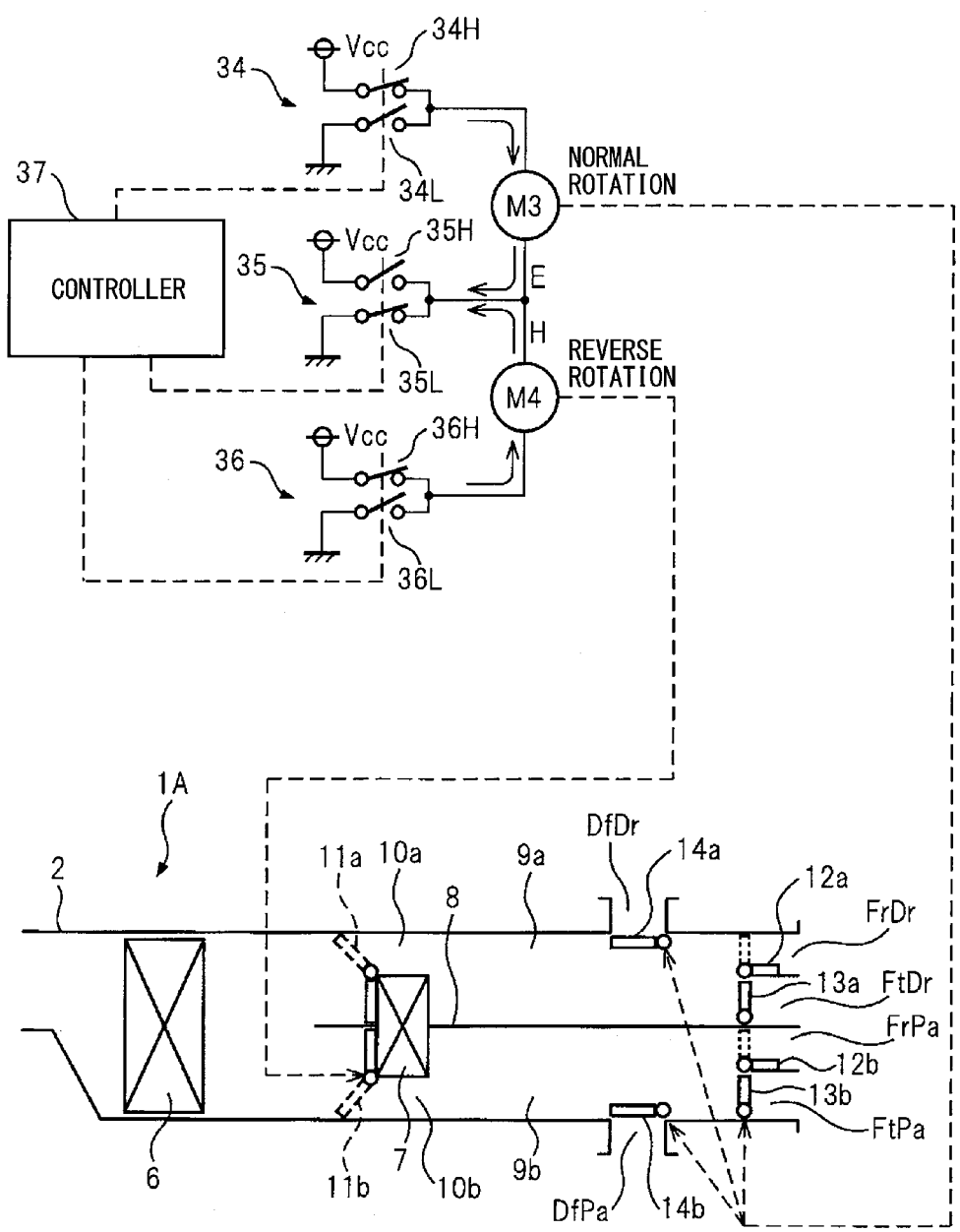
FIG. 11 is an explanatory diagram illustrating operation of each half bridged circuit by the control device when one of the blow-off port switch dampers is opened and when the passenger seat side air mix damper is switched to MAX COOL state using three half bridged circuits.

FIG. 11 illustrates a state of the circuit and states of the mode switch damper 12a, 12b, 13a, 13b, 14a, 14b and the air mix damper 11b when the direct-current motor M3 is rotated in the normal direction and when the direct-current motor M4 is rotated in the reverse direction. At this time, the control part 37 turns on the transistor 34H of the half bridged circuit 34, turns off the transistor 34L, turns off the transistor 35H of the half bridged circuit 35, turns on the transistor 35L, turns on the transistor 36H of the half bridged circuit 36, and turns off the transistor 36L.

Accordingly, current from the power supply Vcc flows in the direction of E from the transistor 34H of the half bridged circuit 34 to the ground through the direct-current motor M3 and the transistor 35L of the half bridged circuit 35. Since the current flows in the direction of E, the rotational direction of the direct-current motor M3 is the normal direction, and at least one of the blow-off port switch dampers 12a, 12b, 13a, 13b, 14a, 14b is rotated through the linkage mechanism. FIG. 11 shows, for example, the face mode in which the face blow-off port FrDr, FrPa is opened, the foot blow-off port FtDr, FtPa is closed, and the defroster blow-off port DfDr, DfPa is closed.

Moreover, the current from the power supply Vcc flows also in the direction of H from the transistor 36H of the half bridged circuit 36 to the ground through the direct-current motor M4 and the transistor 35L of the half bridged circuit 35. Since the current flows in the direction of H, the rotational direction of the direct-current motor M4 is the reverse direction, and the passenger seat side air mix damper 11b is rotated through the linkage mechanism to close the heater core 7 adjacent to the passenger seat side passage 9b and to open the bypass channel 10a. As a result, all the air which flows through the passenger seat side passage 9b after cooled by the evaporator 6 flows into the passenger seat side passage 9b through the bypass channel 10b. Since the air which flows through the passenger seat side passage 9b is not heated with the heater core 7, the air is in the MAX COOL state. In this embodiment, the driver seat side air mix damper 11a in the driver seat side passage 9a is also in the MAX COOL state.

The state shown in FIG. 11 represents, for example, the face mode in a cooling operation. In this mode, when the cooled air is blown off toward the face of an occupant seated on the passenger seat in early stage of the cooling operation, as shown in FIG. 13 (d), the direct-current motor M3 is rotated in the normal direction to open the passenger seat side face blow-off port FrPa with the blow-off port switch damper 12b, at the same time, it is possible to reverse the direct-current motor M4 to move the air mix damper 11b toward the MAX COOL state (described as MAX COOL in the drawing), therefore the comfortableness at the time of cooling operation is not affected.

(vi-b) Reverse Rotation (Direction of F) of the Direct-Current Motor M3, Normal Rotation (Direction of G) of the Direct-Current Motor M4

Figure 12:
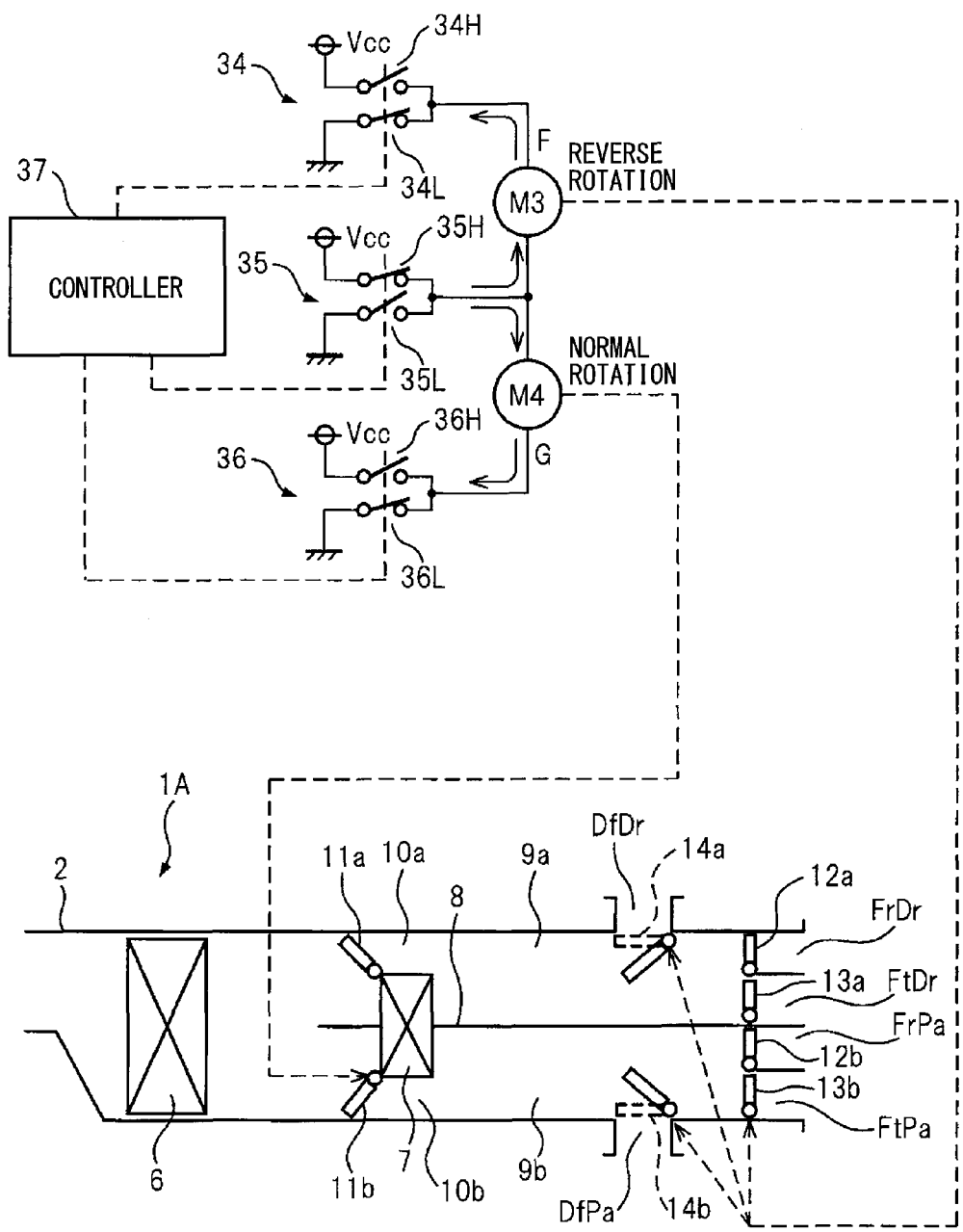
FIG. 12 is an explanatory diagram illustrating operation of each half bridged circuit by the control device when one of the blow-off port switch dampers is opened and when the passenger seat side air mix damper is switched to MAX HOT state using three half bridged circuits.

FIG. 12 illustrates a state of the circuit and states of the mode switch damper 12a, 12b, 13a, 13b, 14a, 14b and the air mix damper 11b when the direct-current motor M3 is rotated in the reverse direction and when the direct-current motor M4 is rotated in the normal direction. At this time, the control part 37 turns off the transistor 34H of the half bridged circuit 34, turns on the transistor 34L, turns on the transistor 35H of the half bridged circuit 35, turns off the transistor 35L, turns off the transistor 36H of the half bridged circuit 36, and turns on the transistor 36L.

Accordingly, current from the power supply Vcc flows in the direction of F from the transistor 35H of the half bridged circuit 35 to the ground through the direct-current motor M3 and the transistor 34L of the half bridged circuit 34. Due to the current which flows in the direction of F, the rotational direction of the direct-current motor M3 becomes in the reverse direction, and the mode switch damper 12a, 12b is rotated in a direction closing the face blow-off port FrDr, FrPa through the linkage mechanism. At least one of the remaining mode switch dampers 13a, 13b, 14a, 14b is rotated in a direction opening the foot blow-off port FtDr, FtPa or the defroster blow-off port DfDr, DfPa.

The state shown in FIG. 12 represents the state where the mode is changed from the face mode to the def mode by the reverse rotation in the direct-current motor M3. In the def mode, the face blow-off port FrDr, FrPa is closed with the mode switch damper 12a, 12b, the foot blow-off port FtDr, FtPa is closed by the mode switch damper 13a, 13b, and the defroster blow-off port DfDr, DfPa is opened by the mode switch damper 14a, 14b.

Moreover, the current from the power supply Vcc flows also in the direction of G from the transistor 35H of the half bridged circuit 35 to the ground through the direct-current motor M4 and the transistor 36L of the half bridged circuit 36. Due to the current which flows in the direction of G, the rotational direction of the direct-current motor M4 is in the normal direction, and the passenger seat side air mix damper 11b is rotated through the linkage mechanism to open the heater core 7 adjacent to the passenger seat side passage 9b. As a result, all the air which flows through the passenger seat side passage 9b after cooled by the evaporator 6 flows into the passenger seat side passage 9b through the heater core 7. Since all the air which flows through the passenger seat side passage 9b is heated with the heater core 7, the air is in the MAX HOT state. In this embodiment, the driver seat side air mix damper 11a in the driver seat side passage 9a is also rotated to open the heater core 7 adjacent to the driver seat side passage 9a and to close the bypass channel 10a.

The state shown in FIG. 12 represents a mode set by an occupant of the vehicle, for example, in order to remove the fogging on the windshield or other windows. In this mode, in order to remove the fogging on the windshield, as shown in FIG. 13 (*d*), the direct-current motor M3 is reversed to open the passenger seat side defroster blow-off port DfPa with the blow-off port switch damper 14*b*. At the same time as when the heated air is blown off toward the windshield, the direct-current motor M4 is rotated in the normal direction to open the heater core 7 adjacent to the passenger seat side passage 9*b* with the passenger seat side air mix damper 11*b* through the linkage mechanism and to close the bypass channel 10*b*, thereby making the air which flows through the passenger seat side passage 9*b* is in the MAX HOT state (described as MAX HOT in the drawing). Thus, the fogging can be removed to raise the safety at a drive time.

The above embodiment is described by an example in which the control circuit 37 drives the half bridged circuits 31 and 32 simultaneously, an example in which the control circuit 37 drives the half bridged circuits 32 and 33 simultaneously, an example in which the control circuit 37 drives the half bridged circuits 31, 32, 33 (henceforth, 31-33) simultaneously, by an example in which the control circuit 37 drives the half bridged circuits 34 and 35 simultaneously, an example in which the control circuit 37 drives the half bridged circuits 35 and 36 simultaneously, and an example in which the control circuit 37 drives the half bridged circuits 34, 35, 36 (henceforth, 34-36) simultaneously. However, the control circuit 37 can also drive all the half bridged circuits 31-36 simultaneously.

Next, the control process of the electronic control unit 40 of this embodiment is explained.

First, in case an automatic air-conditioning mode is set through the switch 41, the electronic control unit 40 executes an automatic air-conditioning control processing for controlling the direct-current motors M1-M4 to bring the temperature of air blown off toward the passenger compartment from the blow-off ports FrDr, FtDr, FrPa, FtPa to approach a target temperature. In performing the automatic air-conditioning control processing, the electronic control unit 40 outputs a control signal for controlling the direct-current motor M1, M2, M3, M4 (henceforth, M1-M4) to the control part 37 through the LIN driver 38.

In connection with this, as mentioned above, the control part 37 controls the half bridged circuits 31-36 to control the direct-current motors M1-M4, and the blow-off port mode is set into one of the face mode, the bilevel mode, the foot mode, and the foot/def mode by opening and closing the dampers 12*a*, 12*b*, 13*a*, 13*b*, 14*a*, 14*b*.

Moreover, when the defroster mode is set through the switch 42, the control part 37 controls the half bridged circuits 31-36 to simultaneously drive the direct-current motors M1-M4, and the heated air can be blown off from the defroster blow-off ports DfDr and DfPa. Moreover, when the automatic air-conditioning mode is set through the switch 41, the control part 37 cancels the defroster mode and performs the automatic air-conditioning control processing as mentioned above.

In case the independent thermal control mode is set up by the switch 43, the control circuit 37 rotates the direct-current motors M2 and M4 to interlock the air mix dampers 11*a* and 11*b* to perform a temperature control.

In this embodiment described above, when the control part 37 of the motor drive unit 30 controls the half bridged circuits 31-33 to simultaneously rotate the electric motors M1 and M2, the half bridged circuit 32 is shared. Moreover, when the control part 37 controls the half bridged circuits 34-36 to simultaneously rotate the electric motors M3 and M4, the half bridged circuit 35 is shared. From these, one of two direct-current motors can be rotated in the normal direction and the other of the two direct-current motors can be rotated in the reverse direction using three half bridged circuits. Therefore, according to the present disclosure, plural direct-current motors can be rotated in the opposite directions, e.g., the normal direction and the reverse direction, respectively, by half bridged circuits whose number is 1.5 times of that of the direct-current motors. Therefore, the number of half bridged circuits can be reduced compared with a case where two half bridged circuits are used for one direct-current motor, so the circuit structure of the motor drive unit 30 can be simplified. For this reason, the cost of the motor drive unit 30 can be reduced.

In this embodiment, the direct-current motors M1 and M2 and the direct-current motors M3 and M4 can be rotated simultaneously, so the air mix damper 11*a*, 11*b* can be driven in a short period of time. Thus, the comfortableness and the responsivity of the air-conditioning state inside the passenger compartment is not affected even by the movement of the air mix damper 11*a*, 11*b*.

As other embodiment concerning the present disclosure, the servo motors for air mix which share a half bridged circuit are not limited to the servo motors which perform temperature adjustment for the driver seat and the passenger seat, and may be servo motors which perform temperature adjustment for a rear seat.

Specifically, an upstream air mix damper is arranged upstream of the heater core, and a downstream air mix damper is arranged downstream of the heater core, inside the duct 2. The upstream air mix damper and the downstream air mix damper are drivable independently, such that the upstream air mix damper is used in order to air-condition, for example, a front seat in the vehicle and that the downstream air mix damper is used in order to air-condition, for example, a rear seat in the vehicle.

In the above embodiment, as an example, the air-conditioner is used for the vehicle. Alternatively, the air-conditioner concerning the present disclosure may be used in a non-mobile unit such as residence or office.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. A control device for an air conditioner which conducts an air conditioning in an air-conditioner unit, into which inside air or outside air is drawn, using an evaporator and a heater core, the control device comprising:

a first actuator and a second actuator which drive a plurality of dampers switching air passages in the air-conditioner unit; and three half bridged circuits which control the first actuator and the second actuator by sharing one of the half bridged circuits, wherein the first actuator is connected to an inside/outside air switch damper, of the plurality of dampers, which switches between the inside air and the outside air, and the second actuator is connected to at least one air mix damper of the plurality of dampers; wherein the first actuator and the second actuator are connected to the three half bridged circuits in a manner that a rotational direction of the first actuator at an inside air mode at which the inside/outside air switch damper closes an outside air intake port and a rotational direction of the second actuator to close an air intake port of the heater core by the air mix damper are opposite from each other.

2. The control device according to claim 1, wherein the at least one air mix damper connected to the second actuator is an air mix damper for a driver seat or a passenger seat of a vehicle.

3. The control device according to claim 1, wherein the three half bridged circuits are configured in a manner that an operation of the first actuator to fully close the outside air intake port by the inside/outside air switch damper and an operation of the second actuator to fully close the air intake port of the heater core by the air mix damper are able to be performed simultaneously.

4. The control device according to claim 1, wherein the three half bridged circuits are configured in a manner that an operation of the first actuator to fully close an inside air intake port by the inside/outside air switch damper and an operation of the second actuator to make all air to flow into the heater core by the air mix damper are able to be performed simultaneously.

5. The control device according to claim 1, wherein the first actuator and the second actuator comprise direct-current motors.

6. The control device according to claim 1, wherein the second actuator is connected to an air mix damper for a driver seat of a vehicle.

7. A control device for an air conditioner which conducts an air conditioning in an air-conditioner unit, into which inside air or outside air is drawn, using an evaporator and a heater core, the control device comprising:
  a third actuator and a fourth actuator which drive a plurality of dampers switching air passages in the air-conditioner unit; and
  three half bridged circuits which control the third actuator and the fourth actuator by sharing one of the half bridged circuits, wherein
  the third actuator is connected to a mode switch damper, of the plurality of dampers, which changes a mode, and
  the fourth actuator is connected to at least one air mix damper of the plurality of dampers; wherein
  the at least one air mix damper connected to the fourth actuator is an air mix damper for a driver seat or a passenger seat of a vehicle;
  when the third actuator is rotated in a first direction, the mode switch damper is switched, according to a rotation amount of the third actuator, in order of a face mode in which only a blow-off port switch damper to blow off conditioned-air from a face blow-off port is operated, a bilevel mode in which only a blow-off port switch damper to blow off conditioned-air from the face blow-off port and a foot blow-off port is operated, a foot mode in which only a blow-off port switch damper to blow off conditioned-air from the foot blow-off port is operated, a foot/def mode in which only a blow-off port switch damper to blow off conditioned-air from the foot blow-off port and a defroster blow-off port is operated, and a def mode in which only a blow-off port switch damper to blow off conditioned-air from the defroster blow-off port is operated, and
  when the third actuator is rotated in a second direction opposite from the first direction, the mode switch damper is switched, according to a rotation amount of the third actuator, in order of the def mode, the foot/def mode, the foot mode, the bilevel mode and the face mode.

8. The control device according to claim 7, wherein the blow-off port switch damper which blows off the conditioned-air from the defroster blow-off port is also operated in the foot mode.

9. The control device according to claim 7, wherein the third actuator and the fourth actuator are connected to the three half bridged circuits in a manner that a rotational direction of the third actuator to change the mode switch damper toward the face mode and a rotational direction of the fourth actuator to close an air intake port of the heater core by the air mix damper are opposite from each other.

10. The control device according to claim 9, wherein the three half bridged circuits are configured in a manner that an operation of the third actuator to set the face mode and an operation of the fourth actuator to fully close the air intake port of the heater core by the air mix damper are able to be performed simultaneously.

11. The control device according to claim 9, wherein the three half bridged circuits are configured in a manner that an operation of the third actuator to set the def mode and an operation of the fourth actuator to make all air to flow in the heater core by the air mix damper are able to be performed simultaneously.

12. The control device according to claim 7, wherein the third actuator and the fourth actuator comprise direct-current motors.

13. The control device according to claim 7, wherein the fourth actuator is connected to an air mix damper for a passenger seat.

14. The control device according to claim 7, wherein the third actuator and the fourth actuator are connected to the three half bridged circuits in a manner that a direction of current flowing through the one of the half bridged circuits to change the mode change damper toward the face mode and a direction of current flowing through the one of the half bridged circuits to close an air intake port of the heater core by the air mix damper are same with each other.

15. A control device for an air conditioner which conducts an air conditioning in an air-conditioner unit, into which inside air or outside air is drawn, using an evaporator and a heater core, the control device comprising:
  a first actuator and a second actuator which drive a plurality of dampers switching air passages in the air-conditioner unit; and
  three half bridged circuits which control the first actuator and the second actuator by sharing one of the half bridged circuits, wherein
  the first actuator is connected to an inside/outside air switch damper, of the plurality of dampers, which switches between the inside air and the outside air, and the second actuator is connected to at least one air mix damper of the plurality of dampers; wherein
  the first actuator and the second actuator are connected to the three half bridged circuits in a manner that a direction of current flowing through the one of the half bridged circuits at an inside air mode at which the inside/outside air switch damper closes an outside air intake port and a direction of current flowing through the one of the half bridged circuits to close an air intake port of the heater core by the air mix damper are the same.

* * * * *